US011240318B1

(12) United States Patent
Locketz

(10) Patent No.: US 11,240,318 B1
(45) Date of Patent: Feb. 1, 2022

(54) SYSTEMS AND METHODS FOR VIRTUAL MULTIPLEXED CONNECTIONS

(71) Applicant: INTEGRITY Security Services LLC, Santa Barbara, CA (US)

(72) Inventor: Neil Locketz, Anaheim Hills, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

(21) Appl. No.: 17/316,975

(22) Filed: May 11, 2021

(51) Int. Cl.
*H04L 29/08* (2006.01)
*H04L 29/06* (2006.01)

(52) U.S. Cl.
CPC ........ *H04L 67/142* (2013.01); *H04L 63/0869* (2013.01); *H04L 67/28* (2013.01)

(58) Field of Classification Search
CPC ....... H04L 67/14; H04L 67/28; H04L 67/141; H04L 67/142; H04L 63/0281; H04L 63/0869; H04L 63/0884
See application file for complete search history.

(56) References Cited

U.S. PATENT DOCUMENTS

| | | | | |
|---|---|---|---|---|
| 7,966,405 | B2* | 6/2011 | Sundaresan | H04L 67/14 709/227 |
| 2005/0005014 | A1* | 1/2005 | Holmes | H04L 61/2575 709/227 |
| 2006/0271692 | A1* | 11/2006 | Kruse | H04L 67/42 709/229 |
| 2009/0219828 | A1* | 9/2009 | Sharma | H04L 1/1685 370/252 |
| 2010/0106841 | A1* | 4/2010 | Barnert | H04L 67/142 709/227 |
| 2017/0289269 | A1* | 10/2017 | Bell | H04L 67/28 |
| 2020/0186507 | A1* | 6/2020 | Dhanabalan | H04L 63/0478 |
| 2020/0344084 | A1* | 10/2020 | Shribman | H04L 61/1511 |

* cited by examiner

*Primary Examiner* — Kostas J Katsikis
(74) *Attorney, Agent, or Firm* — MH2 Technology Law Group LLP

(57) ABSTRACT

A system for facilitating a plurality of virtual transmission control protocol connections between a target application and a source application is provided. The system includes a server proxy, a client proxy, and a network protection interposed between the server proxy and the client proxy. The server proxy is configured to receive an open request from the client proxy via a stateless protocol, including a target identifier, the open request originating from the source application, open a connection between the server proxy and the target application based on the target identifier, provide a response to the client proxy indicating a status of the open request, the response including at least one of a session identifier and a sequence identifier, receive, a data request from the client proxy, including the session identifier and an incremented sequence identifier, and provide the data request to the target application.

30 Claims, 9 Drawing Sheets

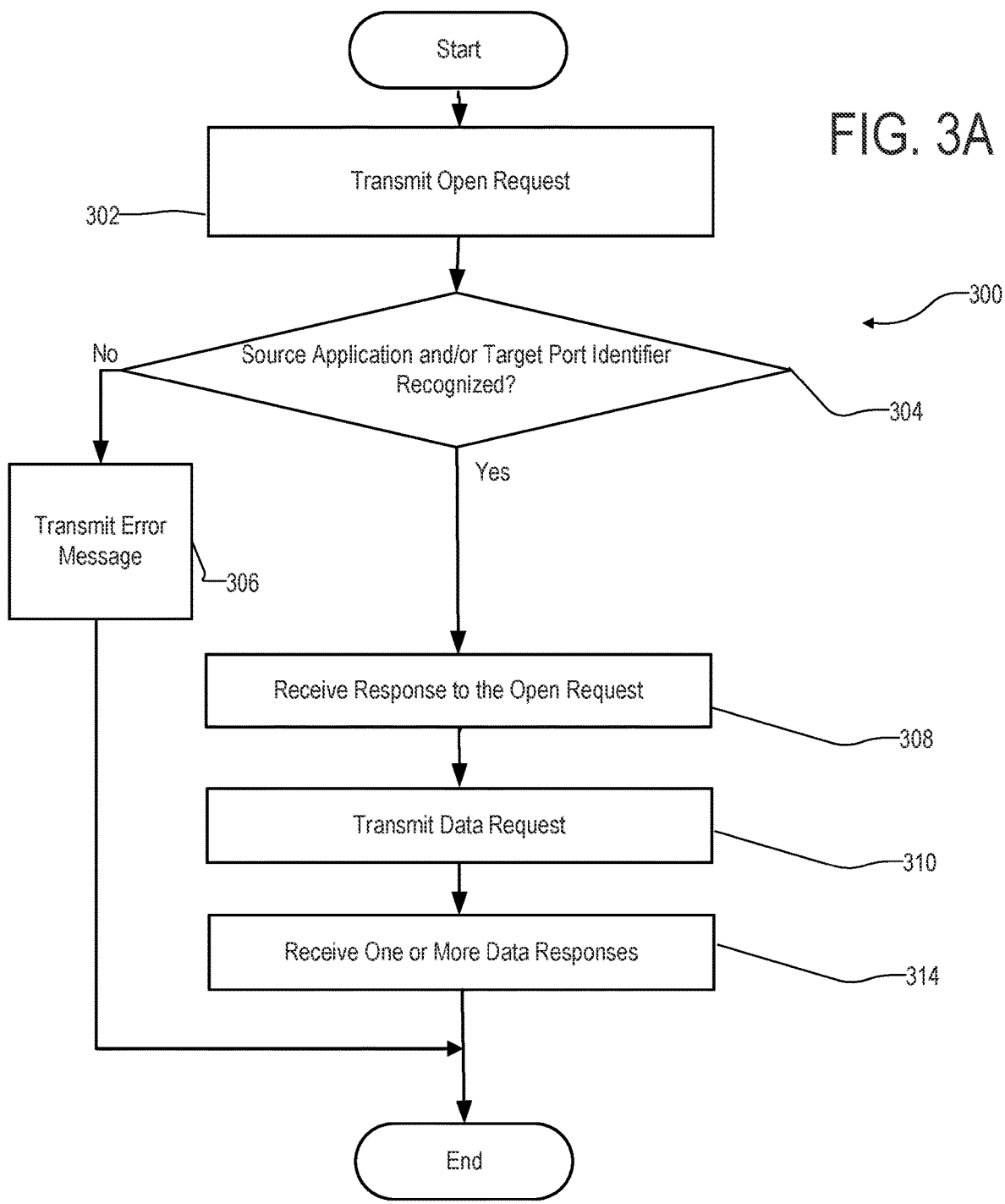

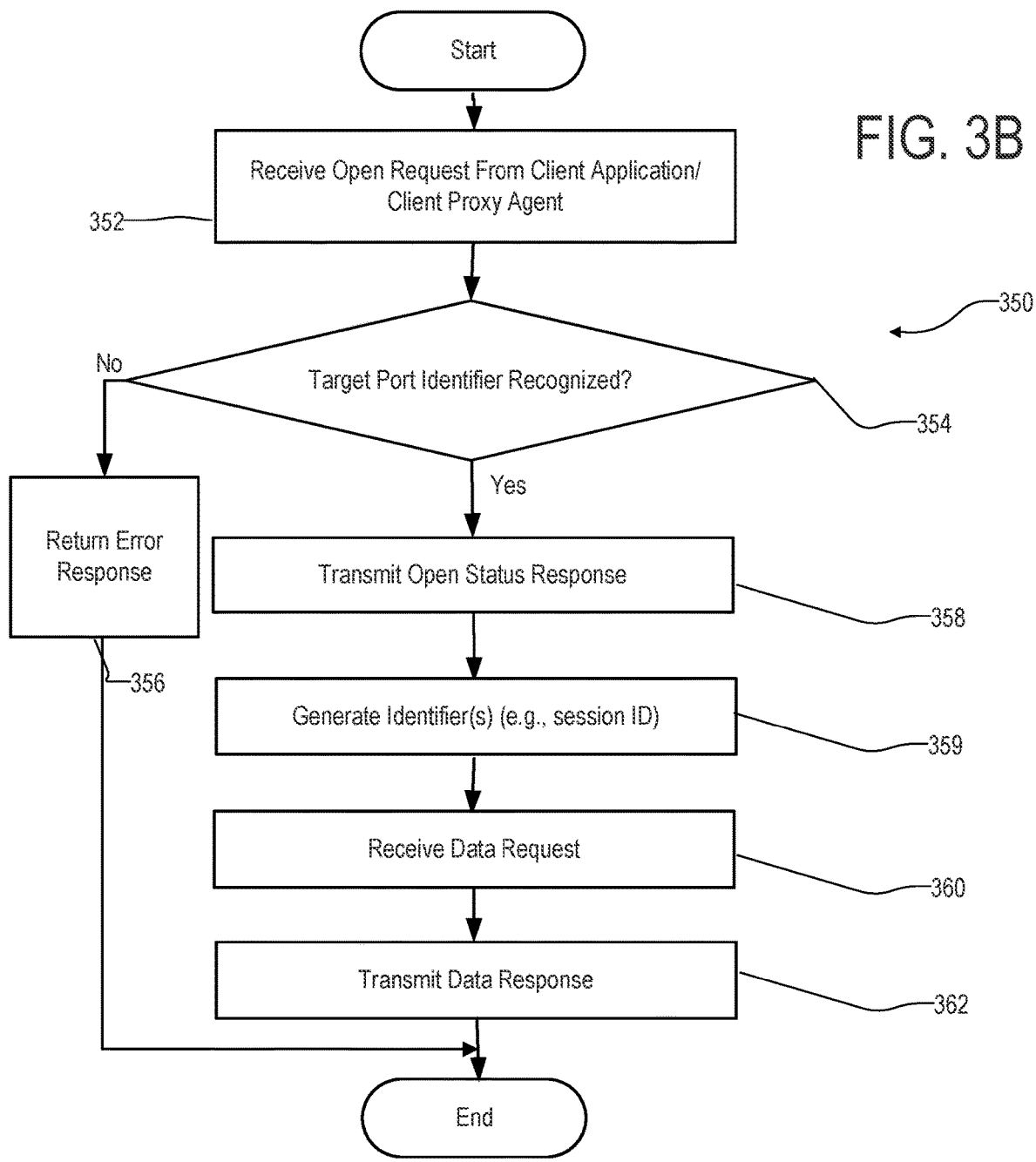

SYSTEMS AND METHODS FOR VIRTUAL MULTIPLEXED CONNECTIONS

TECHNICAL FIELD

This disclosure relates generally to systems, devices, and methods for transmitting data between two or more disparate and protected networks. More particularly, the disclosure relates to improved systems, devices, and methods for emulating stateful, multiplexed transmission control protocol connections over a stateless protocol.

BACKGROUND

Since the inception of network communications, network security has been of high importance among individuals and companies alike. Tools to protect networks from attack have become imperative for allowing safe, secure, and reliable communications between networks.

Transmission control protocol (TCP) connection is one of the main protocols of the Internet protocol suite, and forms part of the transport layer of the Internet Protocol ("IP"). TCP provides stateful, ordered, and error-checked delivery of a stream of bytes between applications running on various hosts communicating via an internet protocol ("IP") network. Many internet applications related to the Internet of Things ("IoT") rely on TCP, for example, secure sockets layer ("SSL") and transport layer security ("TLS") are often run via TCP.

TCP is connection-oriented, and a connection between client and server is established before data is sent via TCP. A server, typically listening (passive open) for connection requests from clients, typically receives a request and opens a connection with a client device. The established connections are bidirectional, stateful (and typically long lived) connections.

With the stability and availability of TCP, there comes vulnerabilities. For example, TCP connections are frequently subjected to denial of service, connection hijacking, TCP veto, and reset attacks, among others. Based on this, many server operators and clients alike protect and isolate their internal local area network ("LAN") from the external wide area network ("WAN") via one or more mechanisms, including for example, firewalls, gateways, proxies, etc.

These protective mechanisms, while providing desired barriers to internal attack, also can present drawbacks when client devices seeking access to server applications positioned behind the protective mechanisms attempt to establish a connection.

SUMMARY

The present inventors have determined that, in order to accommodate various network protective mechanisms and to allow client access for various applications positioned behind the protective mechanisms, it is desirable to create a virtual TCP connection emulating the bidirectionality, stateful-ness, and longevity of a TCP connection, using a stateless, short-lived, unidirectional technical approach.

Accordingly, the present techniques include improved systems, devices, and methods that can provide virtual and multiplexed transmission protocol ("TCP") connections. In some embodiments, a system for facilitating a plurality of virtual transmission control protocol connections between a target application and a source application is provided. The system includes a server proxy, a client proxy, and a network protection interposed between the server proxy and the client proxy. The server proxy comprises computer-executable instructions that cause a processor of the server proxy to perform operations including receiving an open request from the client proxy via a stateless protocol, wherein the open request includes a target identifier, opening a connection between the server proxy and the target application based on the target identifier, providing, via the stateless protocol, a response to the client proxy indicating a status of the open request, wherein the response includes at least one of a session identifier and a sequence identifier, receiving, via the stateless protocol, a data request from the client proxy, the data request including the session identifier and an incremented sequence identifier, the incremented sequence identifier corresponding to the sequence identifier incremented by a predetermined value, and providing, via the stateless protocol, the data request to the target application via the connection between the server proxy and the target application. The client proxy comprises second computer-executable instructions that cause a processor of the client proxy to perform operations including transmitting the open request to the server proxy via the stateless protocol based on a uniform resource locator, receiving, via the stateless protocol, the response to the open request, providing, via the stateless protocol, the data request including the session identifier and the incremented sequence identifier incremented by the predetermined value to the server proxy, and receiving, via the stateless protocol, one or more data messages from the target application via the server proxy.

By providing such a system, a unidirectional, stateless, and conventionally short-lived protocol may be implemented to virtually emulate a TCP connection, and enable broader, and more secure access to protected applications positioned behind the protective mechanisms.

Each of the one or more data messages may include at least the session identifier and a subsequently incremented sequence number incremented by the predetermined value.

The stateless protocol may be one of a hypertext transfer protocol and a hypertext transfer protocol secured.

The sequence identifier may include a randomly generated, incrementable value.

At least one of the session identifier, the sequence number, and the incremented sequence number may be appended to a header of the response and the one or more data messages.

The operations performed by the server proxy may further include, authenticating, by one or more of the server proxy and the target application, the data request based on at least one of the session identifier and the incremented sequence identifier received from the client proxy.

The operations performed by the server proxy may further include, based on the authentication, closing the connection between the target application and the server proxy, and transmitting an error response to the client proxy via the stateless protocol.

The operations performed by the client proxy may further include transmitting, via the stateless protocol a poll instruction following a predetermined period of time without communication from the server proxy, the poll instruction comprising the session identifier and the incremented sequence number incremented by the predetermined value, and receiving, via the stateless protocol, a poll response from the server proxy, the poll response comprising the incremented sequence number incremented by the predetermined value by one of the server proxy and the target application, and one of a no content indicator and a count of buffered messages destined for the client proxy, the buffered messages being buffered at the server proxy during the predetermined period of time.

The operations performed by the client proxy may further include closing, based on a communication with the source application, a connection between the source application and the client proxy, and transmitting to the server proxy a close request via the stateless protocol.

The operations performed by the server proxy may further include receiving the close request, and closing the connection between the server proxy and the target application.

According to further embodiments of the disclosure, a server proxy for facilitating a plurality of virtual transmission control protocol connections between a target application and an external device, is provided. The server proxy includes computer-executable instructions that cause a processor to perform operations including receiving an open request from the external device via a stateless protocol, wherein the open request includes a target identifier, opening a connection between the server proxy and the target application based on the target identifier, providing, via the stateless protocol, an open status response to the external device indicating a status of the open request, wherein the open status response includes at least one of a session identifier and a sequence identifier, receiving, via the stateless protocol, a data request from the external device including the session identifier and an incremented sequence identifier, the incremented sequence identifier corresponding to the sequence identifier incremented by a predetermined value, and providing, via the stateless protocol, the data from the received data request to the target application via the connection between the server proxy and the target application.

The stateless protocol may include one of a hypertext transfer protocol and a hypertext transfer protocol secured.

The sequence identifier may include a randomly generated, incrementable value.

The server proxy may be configured to buffer one or more responsive messages destined for the external device and received from the target application in response to the data request.

The operations may further include providing a second response to the external device, the second response comprising the incremented sequence number incremented by the predetermined value by the server, and at least one of a status of the data request and a value indicating a count of data messages currently buffered at the server proxy and destined for the external device.

The operations may further include authenticating the data request based on at least one of the session identifier and the incremented sequence number.

The operations may include closing the connection between the server proxy and the target application based on a result of the authenticating.

At least one of the session identifier, the sequence number, and the incremented sequence number may be appended to a header of the open status response and the data request.

The connection opened between the server proxy and the target application may be a stateful connection.

The operations may further include receiving, via the stateless protocol, a poll request from the external device following a predetermined period of time without communication from the external device, the poll request comprising the session identifier and the incremented sequence number incremented by the predetermined value by the external device, and providing, via the stateless protocol, a poll response, the poll response comprising the incremented sequence number incremented by the predetermined value, and at least one of a no content indicator and a count of messages buffered for the external device during the predetermined period of time.

The operations may further include, when the poll response indicates that the count of buffered messages is greater than zero, transmitting, via the stateless protocol, the buffered messages to the external device.

The external device may be separated from the server proxy by at least one network protection device.

According to still further embodiments of the present disclosure, a client proxy for communicating with a target application, is provided. The client proxy includes computer-executable instructions that cause a processor to perform operations including providing an open request via a stateless protocol based on a uniform resource locator, wherein the open request includes a target identifier, receiving, via the stateless protocol, a response to the open request, the response indicating a status of the open request and including at least one of a session identifier and a sequence identifier, providing, via the stateless protocol, a data request including the session identifier and an incremented sequence identifier, the incremented sequence identifier corresponding to the sequence identifier incremented by a predetermined value, and receiving, via the stateless protocol, one or more data responses originating from the target application.

The stateless protocol may be one of a hypertext transfer protocol and a hypertext transfer protocol secured.

The sequence identifier may include a randomly generated, incrementable value.

At least one of the session identifier, the sequence number, and the incremented sequence number may be appended to a header of the response and the data request.

The operations may further include providing, via the stateless protocol, a poll request following a predetermined period of time without communication with the target application, the poll request comprising the session identifier and the incremented sequence number incremented by the predetermined value, and receiving, via the stateless protocol, a poll response, the poll response comprising one or more of the incremented sequence number incremented remotely from the client proxy by the predetermined value, a no content indicator, and a count of buffered messages destined for the client proxy and buffered during the predetermined period of time.

At least one of a firewall and a gateway device may be interposed between the client device and the secured application.

The operations may further include transmitting the one or more data messages, via a stateful connection, to a source application.

According to still further embodiments of the present disclosure, a method for performing communications via virtual transmission control protocol connections between a target application within a secured environment and a device external to the secured environment, is provided. The method includes receiving an open request from the external device via a stateless protocol, wherein the open request includes a target identifier, opening a stateful connection via a network resource within the secured environment with the target application based on the target identifier, providing, via the stateless protocol, a response to the external device indicating a status of the open request, wherein the response includes at least one of a session identifier and a sequence identifier, receiving, via the stateless protocol, a data request from the external device including the session identifier and an incremented sequence identifier, the incremented sequence identifier corresponding to the sequence identifier incremented by a predetermined value, and transmitting, via the stateless protocol, data from the received data request to the target application via the stateful connection.

The stateless protocol may be one of a hypertext transfer protocol and a hypertext transfer protocol secured.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated into and constitute a part of this specification, illustrate examples of numerous features of the disclosed subject matter. The accompanying drawings, together with the description, serve to explain the principles of the various techniques described herein.

FIG. 3A is a flowchart illustrating a client-side method according to embodiments of the present disclosure;

FIG. 3B is a flowchart illustrating a server-side method according to embodiments of the present disclosure

DETAILED DESCRIPTION

Reference will now be made in detail to various implementations of the techniques described herein, examples of which are illustrated in the accompanying drawings. Wherever convenient, the same reference numbers will be used throughout the drawings to refer to the same or like parts.

Embodiments of the present disclosure are intended to facilitate communications and data transfer between devices located on disparate local networks linked via a wide area network ("WAN"). The disparate networks of the present disclosure may be isolated from the WAN and one another via one or more network protections devices, and packets intended for a device on one network must pass through the network protection devices to reach the WAN and ultimately, a device on another network. The one or more network protection devices referenced in the present disclosure may comprise any suitable network protection device providing separation between a WAN and a local network, for example, a router, a gateway, a firewall, a modem, a terminal adapter, etc. Such devices may further be configured to perform various services such as port forwarding, network address translation, filtering, security functions, etc. Embodiments of the present disclosure are further intended to facilitate communications where the network protection devices 140 are particularly restrictive of inbound and/or outbound network traffic, as will be described below. Embodiments of the present disclosure allow state to be maintained between the devices on the disparate local networks even though data exchange occurs via a stateless protocol. This technical effect is achieved at least by way of each computing device independently and locally maintaining its respective state and indexing the maintained state with a session identifier and/or a sequence number to be referred to during subsequent communications.

Figure 1A:
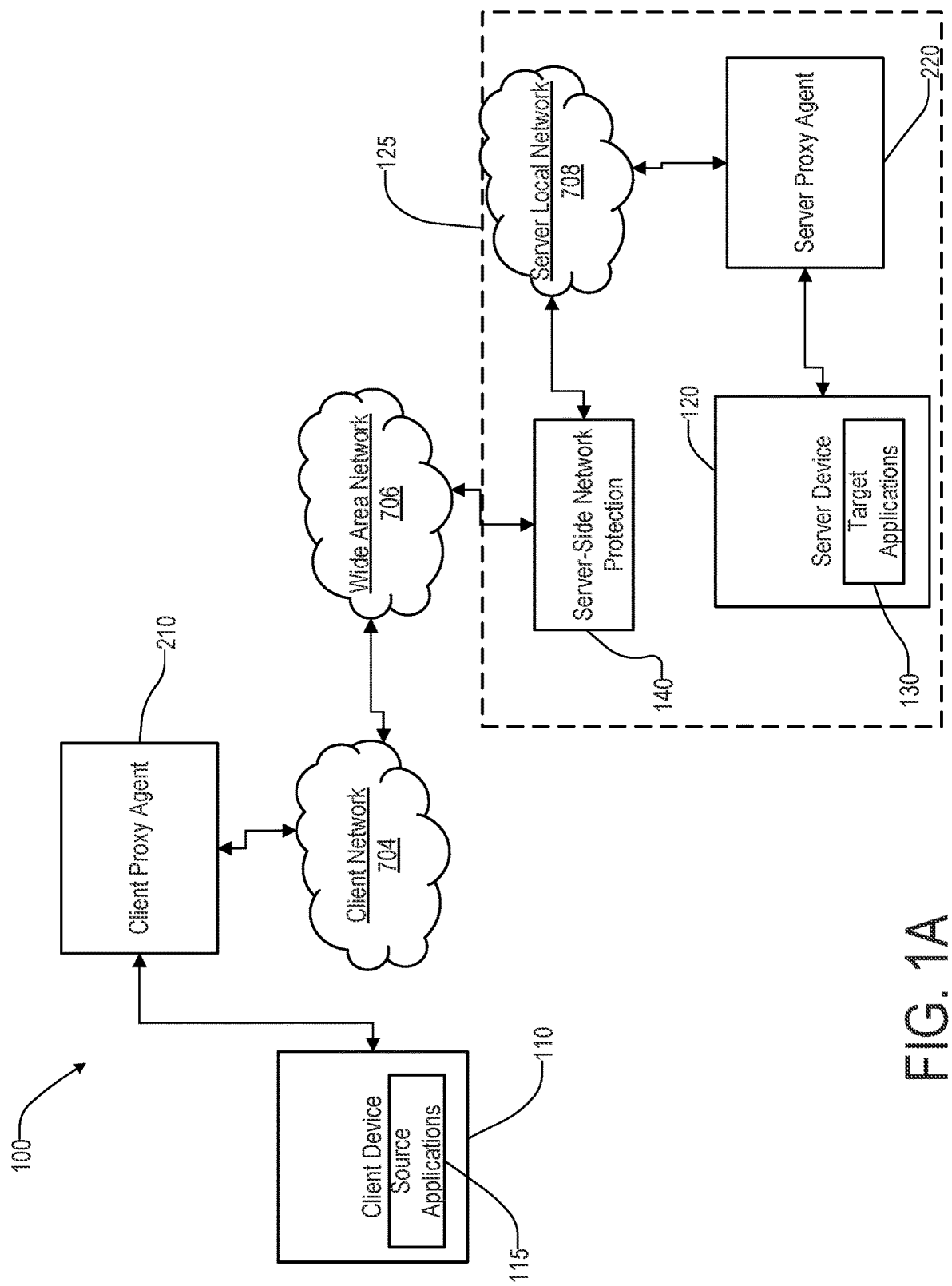
FIG. 1A is a schematic diagram depicting an illustrative configuration according to embodiments of the present invention.

FIG. 1A is a schematic diagram depicting an illustrative configuration according to embodiments of the present invention. The system 100 includes, among others, a client device 110, a client proxy agent 210, a server proxy agent 220, and one or more servers 120 providing access via a plurality of communications networks 704-708, to target applications 130 used by the client 110 and its source applications 115, which require passage of network packets via a network protection device(s) 140. In the example shown, the devices 120, 220 and the network 708 protected by the network protection may be thought of as a secured network environment 125.

Figure 1B:
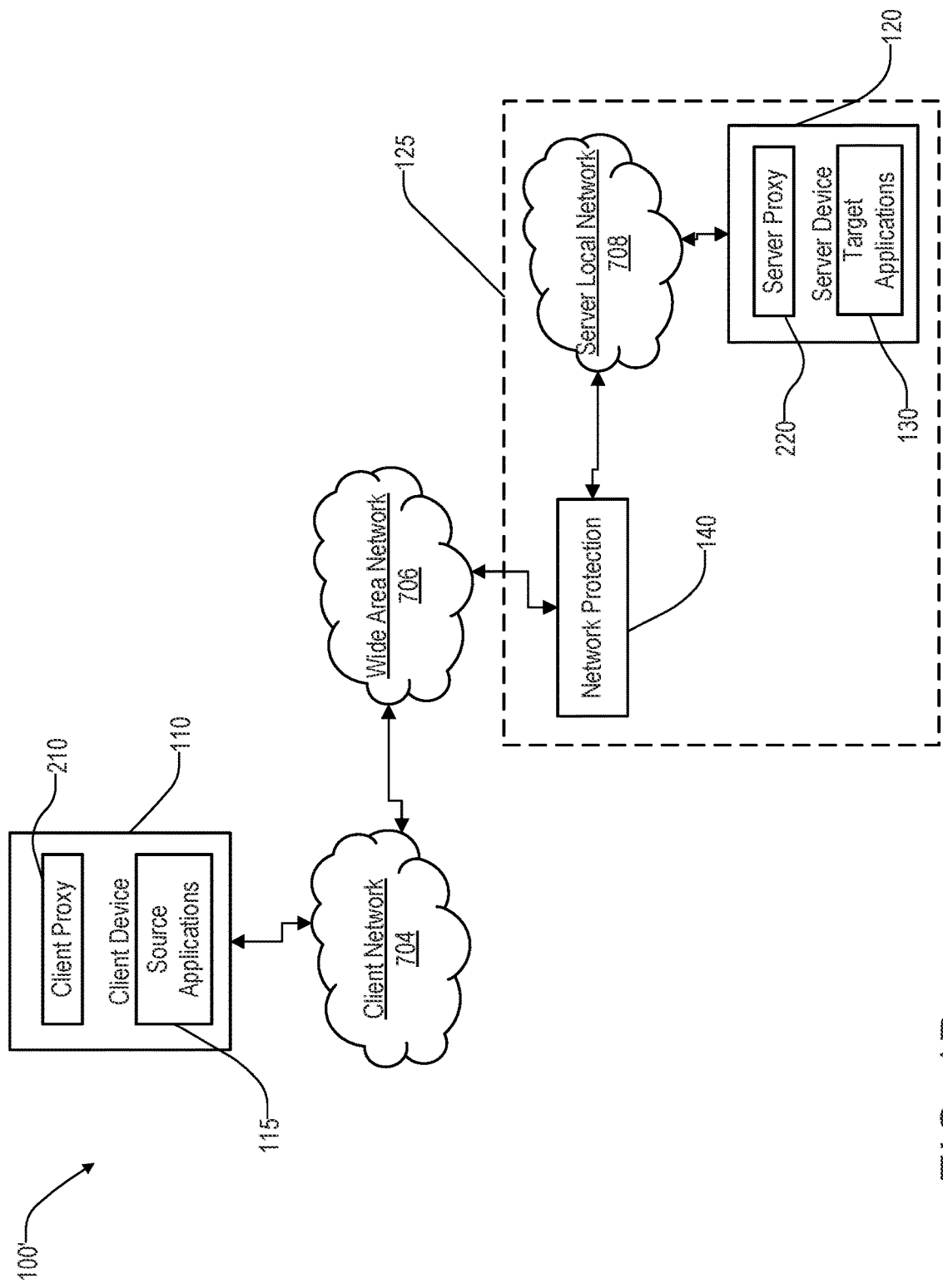
FIG. 1B is a schematic diagram depicting another illustrative configuration according to embodiments of the present invention.

FIG. 1B is a schematic diagram depicting another illustrative configuration 100' according to embodiments of the present invention. The embodiment of FIG. 1B is similar to that of FIG. 1A, except that the functionality of the client proxy agent 210 is implemented within the client 110 and the functionality of server proxy agent 220 is implemented within server device 120. One of skill will understand that other configurations are also possible, and the present examples are not intended to be limiting.

In various embodiments, the client device 110 may comprise any suitable computing device configured for communicating via a network and executing source applications 115 acting as data consumers from, and/or data providers to, one or more target applications 130 executed on the server device 120. For example, a personal computer, a mobile device, a video game console, etc. According to some embodiments, the client device 110 can be an internet of things (IoT) sensor, a consumer appliance, a vehicle, or a device that is part of a vehicle (e.g., an on-board unit (OBU) or the like), among others. For example, the client device 110 can include a vehicle, a watercraft (e.g., a boat), an aircraft, a spacecraft, a medical device, a robot, a drone, a wireless or wired communication module, or an IoT device. In some examples, the client device 110 can correspond to a road-side unit (RSU) of a traffic control device (e.g., a traffic signal, a traffic light, or electronic traffic signage), a digital billboard, a pedestrian warning system, a motorcycle sensor, a bicycle sensor, an electronic sign, a streetlight sensor, or a construction warning sensor, among others.

The client device 110 may be configured to execute various applications to provide services or information to the client device and/or a user thereof. For example, the client device 110 may be configured to execute an application 115 configured to obtain provisioning information (e.g., security certificates, authorizations, etc.), for example, by requesting such information from the server 120. The client device 110 may also be configured to execute applications 115 configured to provide provisioning information to a requesting device, e.g., information generated by the client device 110 and/or received from the server 120. Any number of source applications 115 may be executed by the client device 110, such applications providing any number of different functionalities without departing form the scope of the present disclosure.

According to some embodiments, and as shown at FIG. 1B, the client device 110 may provide functionality related to a client proxy agent 210; such functionality will be described in greater detail below. For example, the client proxy agent 210 may initiate a request on the client side of a connection, i.e., acting as the requester on behalf of one or more source applications 115, where the client 110 is outside of the secured network environment 125, among others.

The server device 120 may be configured to execute one or more server application(s) 130, which may also be referred to as target application(s) 130. As used herein, the terms "server application" and "target application" may be understood to mean a software application 130 or the like that is running on a computing device (e.g., the server device 120) and that is located within a secured network environment 125 (e.g., that is protected by the network protection device 140).

The client device 110 may be configured to execute one or more client application(s) 115, which may also be referred to as source application(s) 115. As used herein, the terms "client application" and "source application" may be understood to mean a software application 115 or the like (e.g., service, interface, etc.) that is running on a computing device (e.g., the client device 110) that requires access to a protected software application (such as server application 130) or the like (e.g., service, interface, etc.). In the examples shown, the protected server application 130 is running on a computing device (e.g., the server device 120) that is linked to a different network (e.g., the protected local network 708) than the client network 704. In operation, one or more of the client applications 115 may require access (e.g., for data consumption, storage, etc.) to and/or information from the target application(s) 130.

In various embodiments, the server device 120 may communicate within the protected local network 708 via one or more network ports that are blocked and/or filtered by a network protection device 140 for outgoing traffic from the protected local network 708. Notably, according to embodiments of the present disclosure, the client/source applications 115 running outside of the secured network environment 125 may be enabled to open any number of connections to the server/target applications 130 within the secured network environment 125, while routing through a single port open via the server proxy 220 as described below.

The server device 120 may be configured to receive request messages from various devices and to return, in response to such messages, response messages including, for example, data, status information, etc. For example, the client device 110 may request a dataset using a query to the server 120, and the server 120 may execute the query and respond to the client 110 with one or more packets including the responsive dataset and/or other information (e.g., a status message indicating no data in the set).

According to some embodiments, and as shown at FIG. 1B, the server device 120 may further provide functionality related to a server proxy agent 210; such functionality will be described in greater detail below. For example, a server proxy agent 220 may receive a request from the client side of a connection, and may act as an intermediary between the client application 115 and one or more server applications 122 from within the secured network environment 125, among others.

The server 120 and its local communication network 708, among others, may be positioned within the secured network infrastructure 125 which may be configured to prohibit some or all communications with clients or other devices located outside the secured network infrastructure. More particularly, in various embodiments as shown, the network protection device 140 may be configured to prohibit outside communication on one or more ports, and/or to scan each packet as it traverses the boundary of the secured network infrastructure 125 to determine whether or not to block a packet. Wide area network ("WAN") traffic (e.g., Internet traffic, cellular network traffic, etc.), comprising packets arriving at the border of the secured network infrastructure 125 via the WAN 706, may be directed to pass through the network protection device(s) 140, which functions to determine whether the network traffic (e.g., packets) may be permitted to enter secured network infrastructure 125, (e.g., to proceed to the network 708).

In various embodiments, the secured network infrastructure 125 may include one or more network protective devices 140 (e.g., a gateway, a firewall, etc.) configured to perform the protective operations, e.g., by permitting only limited or particular network traffic consisting of data packets into and out of the secured network infrastructure 125. The protective operations may further include limiting the use and availability of long-lived, stateful connections, (e.g., transmission control protocol ("TCP") connections), while providing data traffic via more easily controlled, stateless and short-lived connections, such as, for example, hypertext transfer protocol ("HTTP") and hypertext transfer protocol secured ("HTTPS") connections.

According to embodiments of the present disclosure, for implementing communication between devices outside the secured network environment 125 (e.g., client device 110, client proxy agent 210, etc.) and devices within the secured network environment 125, (e.g., the server proxy agent 220 and/or the server 120), a stateless, short-lived, connection protocol that uses a predetermined port may be preselected. For example, according to some embodiments, communication between the client proxy agent 210 and the server proxy agent 220 may be implemented using HTTPS on port 443 (e.g., port 443 of the network protection device 140). Thus in this example, HTTPS on port 443 may be preselected as the designated communication channel to devices 110 that are outside of the secured network infrastructure 125. Any suitable protocol and port may be selected without departing from the scope of the present disclosure.

For communications between a client device 110 and client network 704, any suitable protocol may be implemented, for example TCP. Similarly, within the secured network environment 125, for communication between the server device 120 and the server local network 708, any suitable communication protocol may be implemented, for example, TCP. In other words, for communications within a respective local network, a stateful, long-lived connection protocol may be implemented, thereby enhancing communications without compromising security.

The client proxy agent 210 may be configured to manage a plurality of connections between a plurality of source client applications 115 and a server proxy agent 220. For example, one or more source client applications 115 may initiate communications with one or more target server applications 130 via the client proxy agent 210 and the server proxy agent 220, and the client proxy agent 210 may be configured to maintain at least one of a session identifier, a sequence number, and one or more target identifiers (e.g., a target port identifier) for each of the connections related to a client source application 115. In various embodiments, the session identifier, sequence number, and target identifier(s) may be generated or provided by the server 120 and/or the server proxy agent 220, as described in greater detail with regard to FIGS. 2A-2D.

Client proxy agent 210 may be configured to receive, repackage, and redirect messages received from a source client application 115 executing on a client 110, as well as process response messages received from a target server application 130 via a server proxy agent 220. In other words, client proxy agent 210 is configured to act as an intermediary between client device 110 and server 120, and respective applications thereof. For example, client proxy agent 210 may receive a message from a client application 115 via a stateful connection (e.g., TCP connection) on a predetermined port (i.e., a bound port) over local client network 704. Client proxy agent 210 may identify the client application 115 based on the port on which the message was received. For example, client proxy agent 210 may include one or more lookup tables (e.g., database, file structure, etc.) linking a client application 115 to a bound port and including additional application information related to, for example, retransmission of the request to the server proxy agent 220 via a stateless, short-lived protocol. Such information may include, for example, address information, such as, a uniform resource locator ("URL") (e.g., an Internet Protocol address, a domain name service ("DNS") address, etc.) and a target port, among others for contacting a desired server 120 and server application 130.

Based on the identified information, client proxy agent 210 may be configured to package a corresponding request including some or all of the identified information related to the request. For example, client proxy agent 210 may be configured to repackage the request for transmission using the address identifier and a protocol stack consistent with the stateless, short-lived protocol selected, and may then transmit (i.e., direct) the message via the predetermined stateless protocol to the designated address (e.g., a URL) via the predetermined port. Repackaging and retransmission will be described in greater detail below with regards to FIGS. 2A-2D.

According to some embodiments, the client proxy agent 210 may be separate from the client device 110 and may be executed on any suitable device for performing communications between the client device 110 and the server 120. There may be any number of client proxy agents 210, for example, one client proxy agent 210 for each server 120 that has server applications 130 that are intended to create a virtual stateful connection (via the preselected stateless protocol) to the server's local network 708.

The client proxy agent 210 may also be configured to periodically poll a server proxy agent 220 for data that the server proxy agent 220 has received from the server 120. For example, if the server proxy agent 220 transmits a response indicating that there is yet more data waiting to be read by the client proxy agent 210, and/or if the client proxy agent 210 has not made a request for data to the server proxy agent 220 after a predetermined threshold amount of time has passed (e.g., after 1 minute without communication), then client proxy agent 210 may poll the server proxy agent 220 to request and obtain data and/or status messages by sending a poll request. Alternatively, the server proxy agent 220 may send a response including a indicator that no content (e.g., no responsive data) is currently buffered or available at the server proxy agent 220. In some embodiments, the predetermined threshold period of time may be configurable and may be set based on, for example, latency, application performance, etc.

Server proxy agent 220 may be configured to offer or provide access by one or more client proxy agents 210 to one or more server applications 130 from within the secured network environment 125 and via the network protective application or device(s) 140. Server proxy agent 220 may be configured to receive requests from one or more client devices 110 and/or client proxies 210 via one or more ports opened to WAN traffic by network protective devices 140 for purposes of enabling functionality according to embodiments of the present disclosure.

In various embodiments, server proxy agent 220 is configured to open one or more connections to a server 120 executing a target application 130, inside the secured network environment 125 for purposes of transmitting request messages and receiving data and/or status information related to the request messages. For example, when a request (e.g., an open request) is received by the server proxy agent 220 including a target port on the server 120 (i.e., the port that the client proxy agent 210 has specified in the request message based on an identified client application 115), the server proxy agent 220 may be configured to validate the request (e.g., determine whether the target port is a known port linked to a known server application) and then to attempt to open a stateful, long-lived connection with the server 120 and the associated target application 130 identified by the target port.

Similar to the client proxy agent 210, server proxy agent 220 may include one or more lookup tables (e.g., database, file structures, etc.) linking a target port (i.e., as received from the client proxy agent 210), to a server application 130 and various other application information related to the server 120 and the application 130. For example, such information may include address information, such as, a uniform resource locator ("URL") (e.g., an Internet Protocol address, a domain name service ("DNS") address, etc.) and a server target port, among others, for contacting a desired server 120 and server application 130.

The server proxy agent 220 may determine whether a request and/or message is valid based on, among others, the indicated target port received with the request. For example, when server proxy agent 220 determines that a target port does not exist in the lookup, the server proxy agent 220 may determine that the request is invalid. In some embodiments, although the server proxy agent 220 may determine that the target port is mapped to a server application 130 in the lookup table or the like, such that the server/application is identified as valid, the subsequent request to the server 120 may nonetheless be unsuccessful. In such embodiments, the server 120 may be configured to send an error response message back to the server proxy agent 220 with a status indicating a failed connection. In contrast, when a successful connection is established by the server 120, the server proxy 220 may be configured to respond with a session id and optionally a sequence number identifying the now open session between the application 130 and the client application 115. This tells the client proxy 210 that the connection was successfully opened.

The server proxy agent 220 may be configured to manage a plurality of connections between a plurality of source client applications 115 and itself, as well as connections between one or more target server applications 130 and itself. For example, one or more source client applications 115 may initiate communications with one or more target server applications 130 via the client proxy agent 210 and the server proxy agent 220. The server proxy agent 220 may be configured to generate and maintain at least one of: a session identifier, a sequence number, and one or more target identifiers (e.g., target port identifiers) for each of the connections related to a client source application and configured to append client-bound messages based on this information as described in greater detail with regard to FIGS. 2A-2D. For example, the server proxy agent 220 may be configured to, in response to an open request, securely generate a unique session identifier and optionally a random initial sequence number.

The server proxy agent 220 may further be configured to buffer data intended for the client device 110 and/or the source client application 115. For example, one or more responsive messages to a data request initiated by the source client application 115 may be buffered at the server proxy agent 220 while awaiting communication (e.g., a poll request) from the client proxy agent 210. Such buffering may be performed upon receiving a data message from the target server application 130 when the server proxy agent 220 is aware that the client proxy agent 210 has not been in communication (e.g., within a predetermined period of time such as 4 minutes), and may be implemented using storage devices of the server proxy agent 220 (e.g., random access memory, permanent storage, etc.) and/or external storage devices accessible to the server proxy agent 220.

The server proxy agent 220 may be configured to receive, repackage, and transmit messages from the target server application 130 to the client proxy agent 210. Similarly to the client proxy agent 210, the server proxy agent 220 may repackage data received from the target server application 130 into a format suitable for transmission to the client proxy agent 210. The server proxy agent 220 may further be configured to maintain information for each session established with the target server application 130, including origination data and state data to, for example, enable repackaged messages from the target server application 130 to be validated at the client proxy 210.

Each of the client proxy agent 210 and the server proxy agent 220 may be configured to communicate via a predetermined stateless protocol via a predetermined port for purposes of traversing network protection device(s) 140. For example, HTTP and/or HTTPS may be implemented as the stateless protocol, using Internet protocol addressing (e.g., IPv4, IPv6, etc.) for contacting proxy agent 220, 210. The predetermined port may be, for example, in the case of HTTP port 80 and in the case of HTTPS, port 443. One of skill will recognize that other addressing schemes may be implemented (e.g., using domain name services ("DNS"), etc.) and the default ports for the stateless protocol may be changed as desired, e.g., for security purposes.

Data packet structures associated with the selected short-lived, stateless protocol may include header and body portions which contain various data intended for an application 130 on one or more servers 120 within the secured network environment 125. Therefore, client proxy agent 210 and server proxy agent 220 may be configured to manipulate and modify the header and body portions of data packets being transmitted and received via the selected short-lived stateless protocol. Such modification will be discussed in greater detail below.

While illustrative embodiments of the present disclosure are described with regard to a system having one server device 120, one client device 110, one client proxy agent 210, and one server proxy agent 220, any number of such devices, agents, applications, etc. may be implemented. For example, a plurality of server devices 120 may be configured with various server applications 130 within secured network environment 125, while a plurality of client devices 110 may be configured to access one or more of the plurality of server devices (e.g., depending on where the desired application 130 is) from outside the secured network environment 125. In such an example, there may be implemented one client proxy agent 210 corresponding to each client device 110, and one server proxy agent 220 corresponding to each server 120, among other variants.

FIGS. 2A-2D are swim-lane diagrams showing illustrative examples of messaging sequences for implementing embodiments of the present invention. Each of the swim-lane diagrams of FIGS. 2A-2D represent a phase of communications between a source client application 115 and a target server application 130 via a client proxy agent 210 and a server proxy agent 220. In conjunction with the swim-lane diagrams, FIG. 3A is a flowchart illustrating an example of a client-side method 300 according to embodiments of the present disclosure, while FIG. 3B is a flowchart illustrating an example of a server-side method 350 according to embodiments of the present disclosure.

Figure 2A:
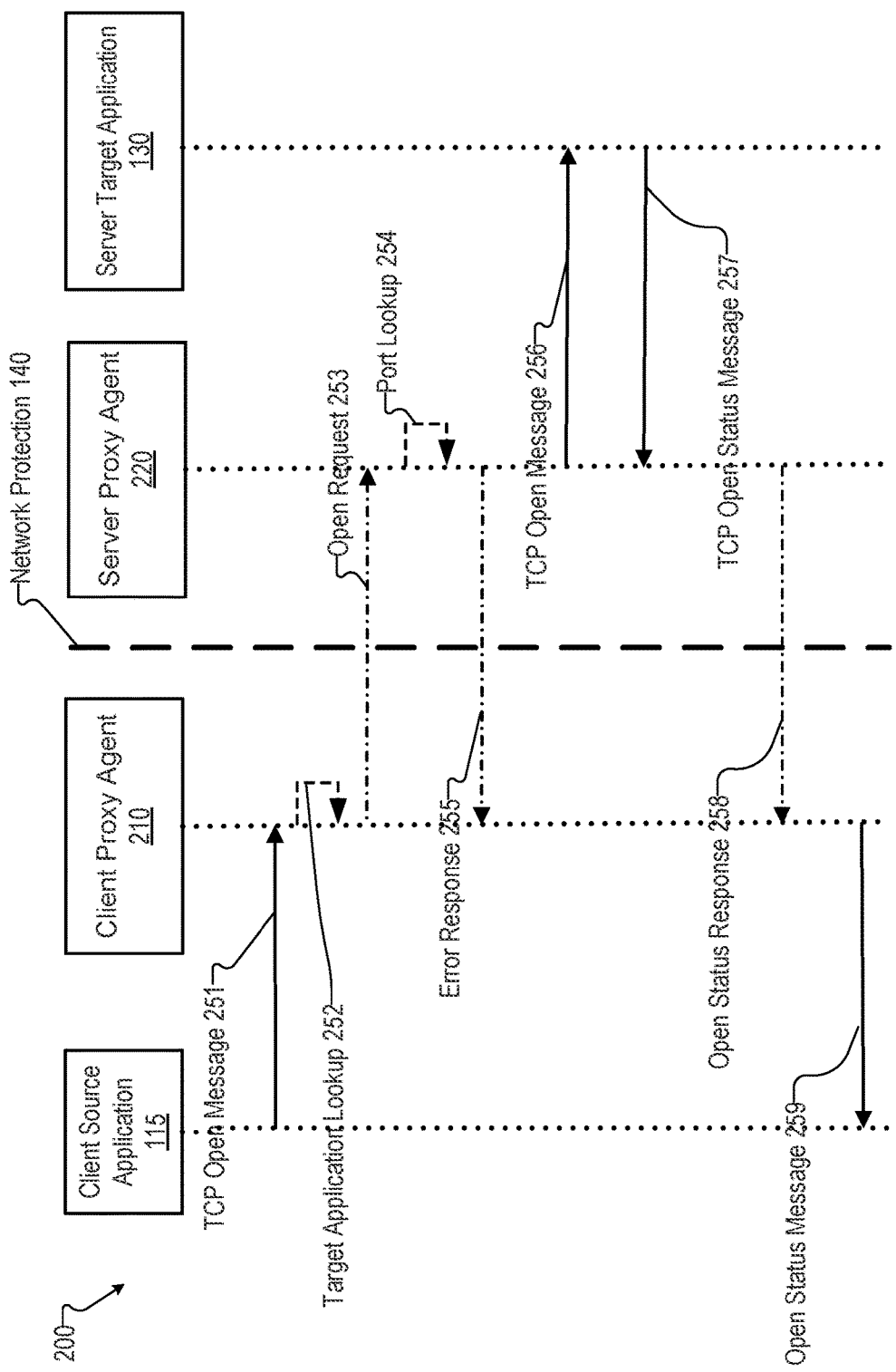
FIGS. 2A-2D are swim-lane diagrams showing illustrative messaging sequences for implementing embodiments of the present invention.

FIG. 2A is a swim-lane diagram 200 showing a connection opening sequence, according to embodiments of the present disclosure, for a virtual connection between a source client application 115 and a target server application 130, the target application 130 being executed on a server 120 located within the secured network environment 125. The source client application 115 may initiate opening of a connection between the source application 115 and the client proxy agent 210 via an open message (message 251) that is received by the client proxy agent 210 (operation 302 of FIG. 3A). In some embodiments, the open message 251 may be sent and received via the client local network 704 (e.g., over a TCP connection). The open message 251, which includes a target identifier (e.g., a target port identifier) destined for the server proxy agent 220 for server application identification, is sent to a predetermined port at the client proxy agent 210, which, as described above, may function to identify the client application 115 making the request. For example, source application 115 may initiate a TCP open request 251 on port 1000 to client proxy agent 210 with a target port identifier of 1001.

Upon receiving the open message 251, client proxy agent 210 may identify the source application 115 based on, for example, the port via which the message was transmitted to the client proxy agent 210 (e.g., by executing a query against a lookup table or the like including application/port linkage or mapping) (FIG. 3A: operation 304). For example, port 1000 to which the message was transmitted may be linked to a first client application 115 "foo" running on client device 110, as found in the lookup table.

In the example shown, client proxy agent 210 also attempts to identify the target server application 130 based on, for example, the target port identifier included in the open message (in the present example target port 1001) (operations 252 and 304). Client proxy agent 210 may query a lookup table to determine the target server application 130 to which the client source application 115 wishes to connect based on the target port identifier included in the request. For example, client proxy agent 210 may look up port 1001 and determine or find information related to the target application 130, such as, for example, address information (e.g., a URL), a target server application name (e.g., "bar"), a data type, an expected response time, etc.

If the client proxy agent 210 is unable to identify the server application 130 in the lookup table (FIG. 3A: operation 304: no), then the client proxy agent 210 may be configured to return an error message to the requesting client application 115 at client 110, among others (FIG. 3A: operation 306; not shown in FIG. 2A). For example, client proxy agent 210 may search for port 1001 in the lookup table and determine that no results exist. Based on the lack of results, client proxy agent 210 may determine that the open request is invalid and may respond with an error message 306 to the source client application 115.

Upon identifying the target server application 130 (FIG. 3A: operation 304: yes) and obtaining the additional information, including address information, from, e.g., the lookup table, the client proxy agent 210 may repackage the open message 251 as a corresponding open request 253 via the stateless protocol (e.g., HTTP, HTTPS, etc.) selected and implemented for use with the system 100. For example, client proxy agent 210 may prepare an HTTPS POST/open request 253 to be sent via the stateless protocol to the address (e.g., URL) of the server proxy agent 220. To do so, client proxy agent 210 may append to the POST message (e.g., in the header(s) of the POST message) a source port identifier and/or a target port identifier based on the identification of the source application 115 and the target server application 130 performed previously by client proxy 210.

To illustrate by continuing the example used above, the open message 251 that the first source application 115 sent via port 1000, and that included a target port indication of 1001 may be transformed to an HTTPS POST request 253 to be sent to port 443 (of, e.g., the network protection device 140) and that is addressed to an address (e.g., URL) identified from the lookup table based on the target server application port 1001 that was included with the request 251. In some embodiments, the source port identifier (e.g., port 1000) may be appended to a header of the HTTPS POST 253. Notably, source port identifier and modification of the source port identifier may or may not be implemented in various embodiments of the system 100.

Once repackaged into a format compliant with the selected stateless, short-lived protocol, the client proxy agent 210 may transmit the open request to the identified address corresponding to the target server application 130 (message 253; not shown in FIG. 3A). For example, the open request 253 may be transmitted to a URL or IP address identified above via HTTPS on port 443, thereby allowing passage through network protection device(s) 140, and reception by the server proxy agent 220 positioned within secured network environment 125.

According to some embodiments, and as noted above, network protection device(s) 140 may include a gateway and/or router configured for port forwarding such that upon receipt of a message or request on one (or more) specific port(s) that supports the functions and operation described herein, for example, the specific port may default to HTTPS port 443 (or other predetermined port), the gateway and/or router may automatically redirect (i.e., forward) the message or request to the server proxy agent 220 for processing.

Upon receiving the open request 253, which passed through network protection 140 via the specifically configured port, and which may employ a stateless short-lived protocol, (FIG. 3B: operation 352), the server proxy agent 220 may determine whether the target port specified in a header of the open request 253 is a valid target port for a server 130 within the secured network environment 125 (operation 254) ((FIG. 3B: operation 354). For example, and similarly to client proxy agent 210, server proxy agent 220 may use a lookup table or other suitable data structure containing information that links or otherwise associates a target port and a target server application 130 and other related information. Continuing the example above, the target port identifier "1001" may be linked to a target server application 130 on a server 120, and server proxy agent 220 may obtain, from the lookup table, addressing information or the like for contacting or interfacing with the target server application 130 at the server 120.

If the server proxy agent 220 is unable to identify a target server application 130 and/or a target server 120 based on the target port identifier included in a header of the open request (e.g., if there is no entry for the target port in the lookup table during operation 254) (FIG. 3B: operation 354: no), then the server proxy agent 220 may send an error response indicating an improper request (message 255) (FIG. 3B: operation 356) via the stateless, short-lived protocol to client proxy agent 210 (not shown in FIGS. 3A, 3B). For example, in the case where HTTP or HTTPS is implemented as the stateless, short-lived protocol for communications between the client proxy agent 210 and the server proxy agent 220, the server proxy agent 220 may return an HTTP 404 error response to indicate that the target server application 130 and/or the target server 120 were not recognized or are not valid.

If, on the other hand, the server proxy agent 220 identifies the target server application 130 and/or the target server 120 based on the target port identifier included in a header of the open request (FIG. 3B: operation 354: yes), then the server proxy agent 220 may establish a stateful, long-lived connection (e.g., TCP) with the server application 130 (message 256; not shown in FIG. 3B). For example, the server proxy agent 220 may issue a TCP open message to the server 120 on which server application 130 resides. The server proxy agent 220 may address the server 120 based on the information that was found in the lookup during identification of the target port identifier provided in a header of the open request from the client proxy agent 210. One of skill in the art will recognize that any suitable protocol to be used for communications between the server proxy agent 220 and the server application 130, and that TCP is intended as exemplary only.

When a connection is successfully established between the server proxy agent 220 and the server application 130, then the server application 130 and/or the server 120 may reply with an open status message (message 257; FIG. 3B: step 358. The open status message 257 may include a status as well as additional information, for example, a new virtual connection ("vconn") target port identifier indicating the target port at the server 120 for the current session with the target server application 130 on the server 120. For example, upon successfully establishing a connection, the server 120 may send a TCP ACK (e.g., message 257) to the server proxy agent 220, and included in a header of the TCP ACK may be appended, by the server 120, a new communication target port, e.g., 1888, thereby indicating success and providing a new vconn port which is to be referenced in communication with the target server application 130.

In response the server proxy agent 220 generates desired identifiers (operation 359), for example, a unique session identifier corresponding to the established connection from the client application 115 to the target server application 130, this unique session identifier being maintained throughout communications between the target server application 130 and the source client application 115. For example, server proxy agent 220 may randomly generate the unique session identifier as a global unique identifier ("GUID"). Further the server proxy agent 220 may securely generate a random sequence number (e.g., a random integer) as an initial sequence number for the session. For example, the server proxy agent 220 may randomly generate the session number based on, for example, an initial seed value fed into a random number generator. According to further embodiments, the random sequence number may be generated by the target server application 130. According to still further embodiments, a random number generator (e.g., a secure random number generator) associated with an operating system of the server proxy agent 220 may be used for generating a random number. In such embodiments, entropy may be included via, for example, processor temperature, user interaction, etc.

The server proxy agent 220 then stores the unique session identifier, the sequence number, and according to some embodiments, the vconn target identifier for future reference as will be described in greater detail below.

Following generation and storage of the unique session identifier and the sequence number, the server proxy agent 220 may create an open status response (message 258) indicating a successful connection to the server application 130/server device 120 and transmit the message to the client proxy agent 210 via the stateless protocol (FIG. 3B, operation 358). The server proxy agent 220 may include the unique session identifier, the sequence number, and, according to some embodiments, the vconn target port identifier in the open status response 258. This open status response 258 may be packaged based on the stateless, short-lived protocol selected for use within the system 100. For example, the header(s) of an HTTPS 200 "OK" message may be appended to include the unique session identifier and the sequence number. The HTTPS 200 "OK" message thus appended via the stateless, short-lived protocol to the client proxy agent 210.

The client proxy agent 210 receives the open status response 258 (FIG. 3A: operation 308). Upon determining that the message status indicates successful, the client proxy agent 210 may transmit 259 (not shown in FIG. 3A) to the source client application 115, via the previously established stateful, long-lived connection protocol (e.g. TCP), information indicating the successful open status including the unique session identifier, the sequence number, and where implemented, the vconn target port identifier. The source client application 115, upon receiving the open status message indicating success, may begin communicating with the server application 130 using the unique session identifier the sequence number and, where implemented, the vconn target port identifier.

Figure 2B:
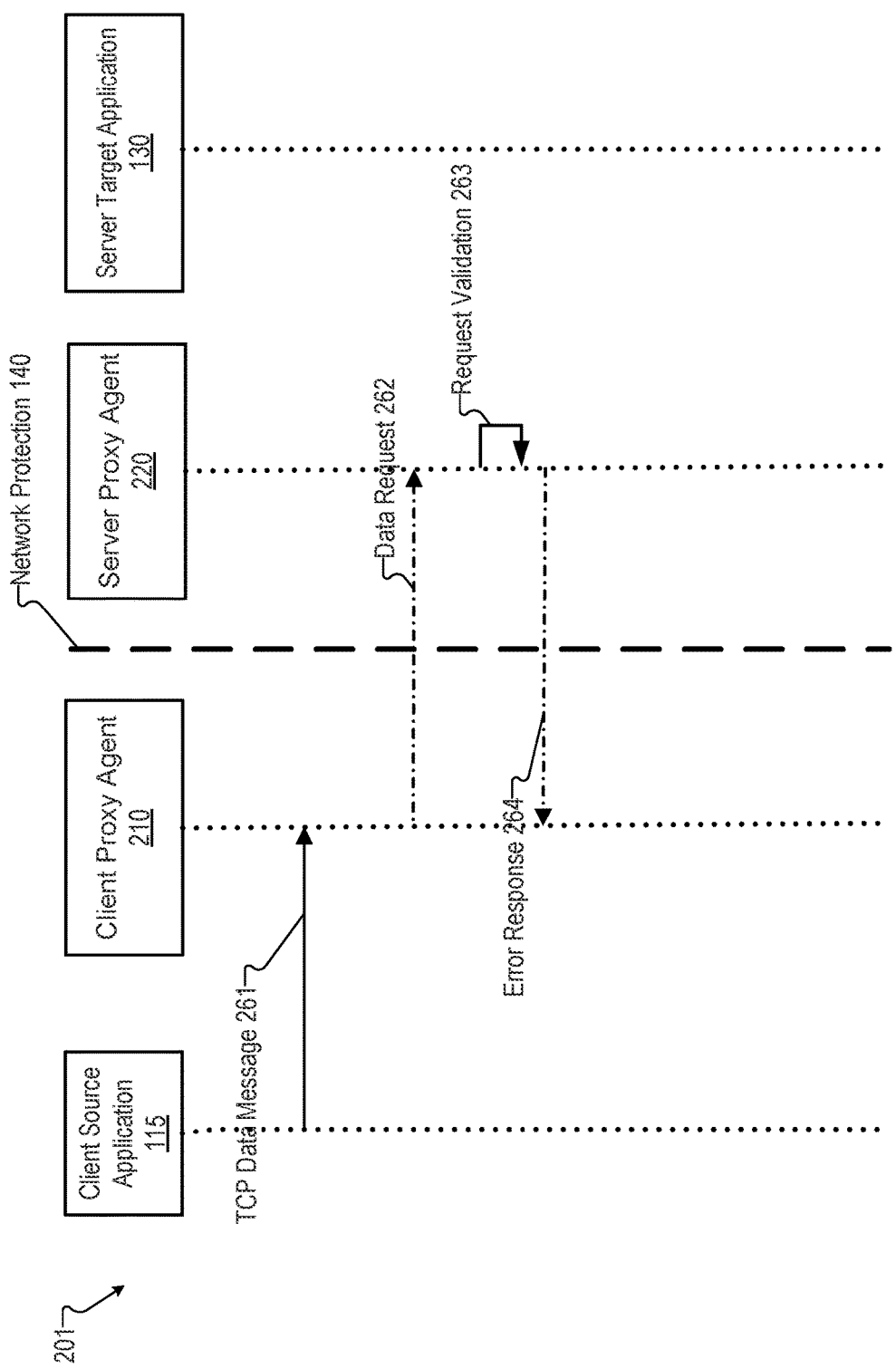

FIG. 2B is a swim lane diagram 201 illustrating an example of a data request validation sequence according to embodiments of the present disclosure. Notably, the events, operations, and messages of FIG. 2B are executed following completion of successful connections for a communication channel as highlighted with regard to FIG. 2A.

After the communication channel is set up, the source client application 115 may transmit one or more data message(s) 261 to the client proxy agent 210 such that the data message 261 can be communicated to the target server application 130 (FIG. 3A: operation 310). For example, the source client application 115 may prepare data, for example, identifying data such as a digital certificate and/or other data chosen by the source client application 115, and the source client application 115 may send the data, (including, e.g., the identifying information) via the stateful, long-lived connection previously established, to the client proxy agent 210.

The client proxy agent 210 then repackages the data message 261 received from the source client application 115 into a data request for transmission to the server proxy agent 220. The data may be repackaged according to the preselected stateless, short-lived protocol used to communicate between the client proxy agent 210 and the source client application 115. In various embodiments, the repackaging at the client proxy agent 210 may comprise, for example, including with the data packet (e.g., appending to a header), at least the previously acquired unique session identifier and the sequence number incremented by a predetermined amount (e.g., 1, 2, 10, 15, etc.). According to some embodiments, the sequence number may be incremented by a value known to or expected by the server proxy agent 220. Alternatively, the sequence number may be incremented by an initially random value, that, once established, may be used throughout the life of a communication session. According to some embodiments the increment value may be communicated, for example, by the client proxy 210 to the server proxy 220, or vice versa, upon successful establishment of a session as defined by a session ID.

In some embodiments, the client proxy agent 210 may insert the data received from the source client application 115 into the body of, for example, an HTTPS/data request 262, and modify a header of the HTTPS/data request 262 to include fields/information comprising the unique session identifier and the incremented sequence number, perhaps among others. Notably, in some implementations, the vconn target port identifier may also be included in a header of the repackaged data request.

In various embodiments, the client proxy agent 210 then increments and saves the incremented sequence number for comparison with a subsequent communication that may be received from the server proxy agent 220 for validation purposes to be described in greater detail below.

The client proxy agent 210 may then transmit the data request 262 via the stateless, short-lived protocol via the open port in the network protection devices 140, to the server proxy agent 220 (FIG. 3A, operation 310). For example, the repackaged data request 262, including the session identifier and incremented sequence number, may be transmitted via HTTPS to port 443 thereby passing through the network protection devices 140 and arriving at server proxy agent 220.

Upon receipt of the data request 262 from the client proxy 210 (FIG. 3B: operation 360), the server proxy agent 220 then undertakes at 263 to validate the data request 262 based on the unique session identifier and in some embodiments, the incremented sequence number. As noted above, in various embodiments, the server proxy agent 220 stores all unique session identifiers and the associated sequence number for future reference. In such embodiments, upon receiving the data request 262, the server proxy agent 220 may examine or process the header(s) of the data request 262 to obtain the unique session identifier and the sequence number, and may then determine whether the session identifier included with the request is a known session identifier for a current session associated with server 120.

If the session identifier cannot be validated by the server proxy agent 220 (e.g., is not among the currently active session identifiers), then the data request 262 may be flagged as a failed data request and the server proxy agent 220 may send an error response 264 back to the client proxy agent 210 (not shown in FIGS. 3A, 3B). The client proxy agent 210 may then notify the source client application 115 and/or the client device 110 that the communication failed, for example, because the session is either unknown or has expired at the server 120. The source client application 115 may then take suitable action to reestablish a connection and communication channel with the target server application 130, if desired.

According to some embodiments, when the server proxy agent 220 is unable to validate the sequence number and/or the session identifier, and the client proxy agent 210 receives the error response indicating a failed data request in response, the client proxy agent 210 may close the stateful, long-lived connection established with the source client application 115. Alternatively, the client proxy agent 210 may allow the source client application 115 to attempt a predetermined number of times to resend the data request 262.

In various embodiments, as a further function of the request validation processing 263, when the session identifier received with the data request 262 matches a known session identifier corresponding to a pending session with the target server application 130, then the server proxy agent 220 may compare the sequence number received with the data request 262 to the previously stored sequence number associated with that session identifier to determine whether the received sequence number matches the stored sequence number incremented by the predetermined value (e.g., 1). When the stored sequence number incremented by the predetermined value (e.g., 1) does not match sequence number received with the data request 262, the data request 262 is flagged as a failed data request, and an error response 264 is sent to the client proxy agent 210. When the stored sequence number incremented by the predetermined value does match the sequence number received with the data request 262, the data request 262 is validated and the server proxy agent 220 may proceed with processing the data request 262, as highlighted in FIG. 2C.

Figure 2C:
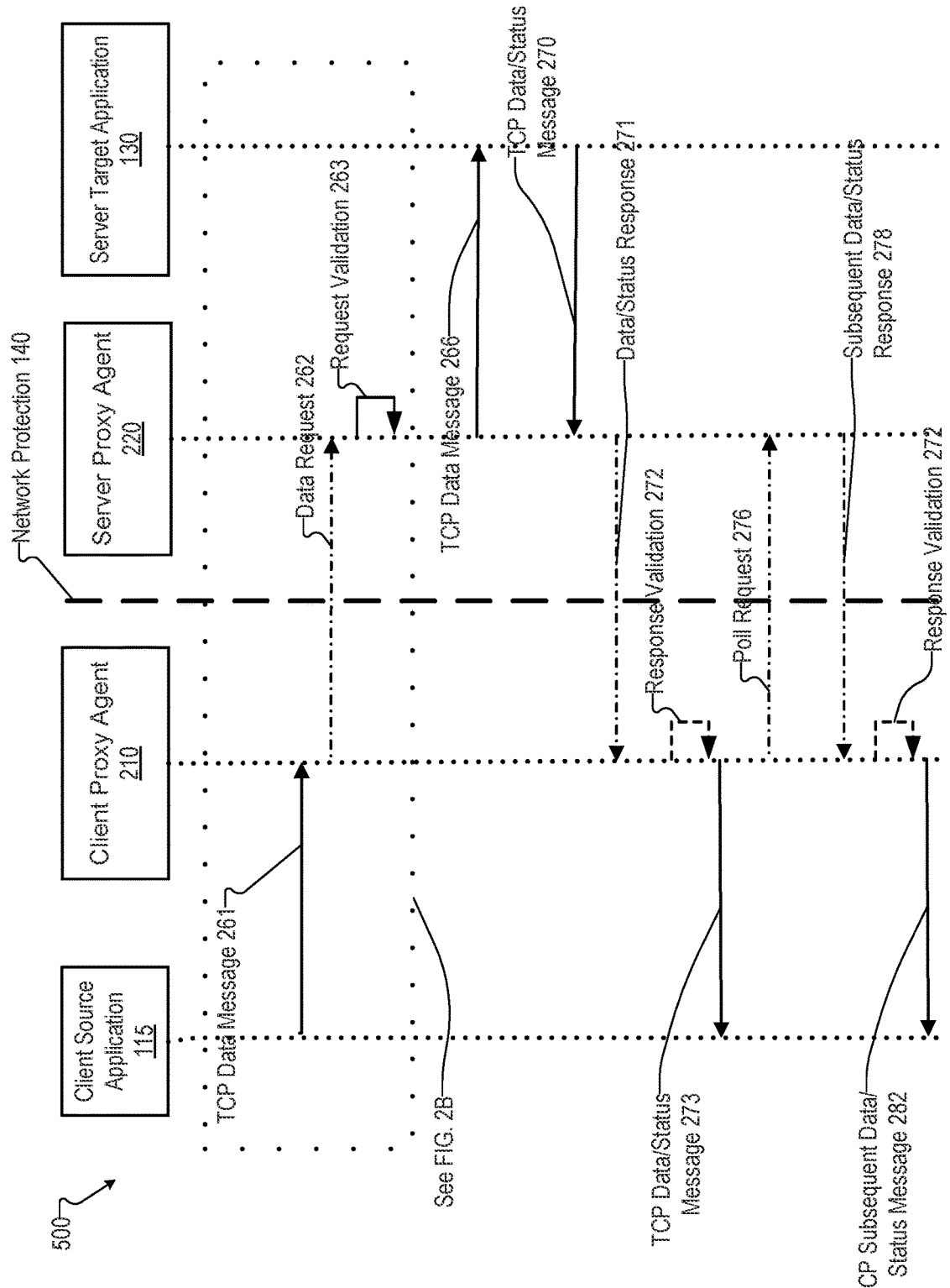

FIG. 2C is a swim lane diagram 201 showing a data transaction sequence according to embodiments of the present disclosure. As shown about one-third of the way down FIG. 2C, following a successful validation of the data request 262, the client proxy agent 210 may send a corresponding data message 266 to the target server application 130 via the stateful, long-lived connection previously established between the server proxy agent 220 and the server 130, and where implemented, on the indicated vconn target port for the target server application 130.

The target server application 130 may then process the data request 266 according to rules and instructions defined by the target server application 130 to determine whether to transmit or provide responsive data to the requester (e.g., client application 115) and/or what data to provide. For example, the target server application 130, upon receiving a message 266 that includes a data request for a digital certificate, may, for instance, undertake steps to validate that the requester is entitled to receive such a certificate, for example, based on the data included with the data message 266.

If the target server application 130 determines that the source client application 115 has made an invalid request, then the target server application 130 may send a status message 270 indicating that the request is invalid to the server proxy agent 220 via the stateful, long-lived connection. The server proxy agent 220 may then repackage the invalid-request status message 270 according to the predetermined stateless, short-lived protocol (e.g., HTTPS) and transmit the repackaged status response 271 to the client proxy agent 210. For example, such a status response may be implemented as an HTTP 400 invalid request response. In various embodiments, the status message 270 is repackaged to include the session identifier and preferably the sequence number, incremented by the predetermined value, which may, for example, be appended to a header of the status message 271, such that the client proxy agent 210 can determine which source client application 115 issued the invalid request (e.g., 261).

If, on the other hand, the target server application 130 determines that the request in the data message 266 is a valid data request, then the target server application 130 may process the data request as provided in its rules and instructions. Continuing the example above, if the server application 130 determines that the digital certificate request is valid, for example, based on the data included with the data message 266, then the target server application 130 may generate or obtain the certificate and transmit the certificate to the server proxy agent 220 by including or repackaging it in a data message 270. The transmission to the server proxy agent 220 may be made over the stateful, long-lived connection previously established between the server application 130 and the server proxy agent 220.

Upon receiving the data message 270 from the server application 130, the server proxy agent 220 is configured to reformat or repackage the data message 270 based on the preselected stateless, short-lived protocol into a corresponding data response 271. For example, the server proxy agent 220 may first obtain the sequence number previously stored for the session associated with the data request (e.g., 262), and then increment that sequence number by the predetermined value (e.g., 1). The server proxy agent 220 may then generate an HTTPS data response and include in (e.g., append to the header(s) of) the HTTPS data response the unique session identifier associated with the data request and the incremented sequence number. Further, the body of the HTTPS data message may be appended to include the digital certificate and/or other data returned from the target server application 130. Alternatively, according to some embodiments, the server proxy agent 220 may not include the unique session identifier and/or the incremented sequence number with responses generated subsequent to the open status response 258 via the stateless protocol. In such embodiments (as well as optionally in other embodiments), the server proxy agent 220 may generate only one response per request received and therefore, the client proxy agent 210 may implicitly identify the session identifier and/or the unique sequence identifier based on the known session identifier and the known increment value for each response received from the target server application 130 for which a session was already established.

According to some embodiments, in response to a data request message 266, the target server application 130 may generate a plurality of responsive data messages 270 intended for the source client application 115. The target server application 130 may provide the plurality of responsive messages to the server proxy agent 220 for transmission to the source client application 115 via the client proxy agent 210. In such embodiments, the data message 271 may include (e.g., appended in the header(s), in the body, etc.) a message count corresponding to the number of messages in the plurality, which may be buffered at the server proxy agent 220 and intended for the source client application 115. For example, a data request or query initiated by the source client application 115 may cause the target server application 130 to retrieve multiple data sets and/or a data set having a size that is large enough to require parsing into smaller pieces or packets for transmission. The data message 271 may then be formatted to indicate the number of data sets and/or packets intended for the source client application 115 in response to the query.

As shown in the example of FIG. 2C, the server proxy agent may next provide or transmit the repackaged status/data response 271, e.g., via the stateless, short-lived protocol and via the special port (e.g., 443), or the like, via the network protection device 140, to the client proxy agent 210 (FIG. 3B: operation 362).

Upon obtaining or receiving the data/status response 271 (FIG. 3A: operation 314) the client proxy agent 210 is may be configured to validate the data/status response 271 to ensure security of the communication and determine and/or validate the intended source client application 115. Validation of the data/status response 271 may be performed by checking the unique session identifier and the sequence number provided in the headers of the data status response 271, for example, by comparing to known values stored at the client proxy agent 210. The client proxy agent 210 may extract from the headers of the data status message 271 the unique session identifier and determine (e.g., by looking up active session identifiers) whether the session identifier is known to the client proxy server agent 210. If the session identifier is unknown to the client proxy server agent 210 based on the lookup, the response may be processed (e.g., discarded) as invalid. On the other hand, when the session identifier is known to the client proxy server agent 210, the client proxy agent 210 may, in some embodiments, then extract the sequence number provided with the data/status message 271 and compare the sequence number to the previously stored sequence number at the client proxy agent 210 to determine whether the sequence number has been properly incremented by the predetermined value. When the sequence number has been incremented by the predetermined value, the data/status response 271 is validated and may then be transmitted to the source client application 115 by the stateful, long-lived connection previously established (data/status message 273; not shown in FIG. 3A).

Alternatively, according to embodiments, in which the server proxy agent 220 has not included the session identifier and/or the incremented sequence number, the client proxy agent 210, upon obtaining or receiving the data/status response 271 may forward the response to the associated source application 115 at client device 110 based on the trusted session established with the server proxy agent 220.

When the client proxy agent 210 receives a data/status response 271 (FIG. 3A, operation 314) indicating a plurality of messages destined for the source client application 115 (e.g., based on an indication in a header of the data/status message 271), or where communication between the client proxy agent 210 and the server proxy agent 220 has been absent for a predetermined threshold period of time (e.g., timed out after four minutes), the client proxy agent 210 may send a poll request 276 (not shown in FIGS. 3A, 3B) via the stateless, short-lived protocol to the server proxy agent 220 to cause the server proxy agent 220 to transmit a subsequent data/status message 278 corresponding to the next message in the queue for the source client application 115 via the stateless, short-lived connection. For example, the client proxy agent 210 may receive from the server proxy agent 220 a message in which a header indicates two messages intended for the source client application 115. Following receipt of the first message from the server proxy agent 220, the client proxy agent 210 may send an HTTPS/poll request (message 276) to the server proxy agent 220. In response, the server proxy agent 220 may then transmit the second message intended for the source client application 115 (e.g., similar to FIG. 3B, operation 362). Each of the subsequent data/status messages 278 may be validated in a similar manner to that discussed above (e.g., 272) with regard to the initial data/status message 271, and upon validation the data sent to the source client application 115 via the stateful, long-lived connection (message 282). Alternatively, where no data messages are currently buffered for the client proxy agent 210, the server proxy agent 220 may send a "no content" indicator in the poll response to the poll request.

Figure 2D:
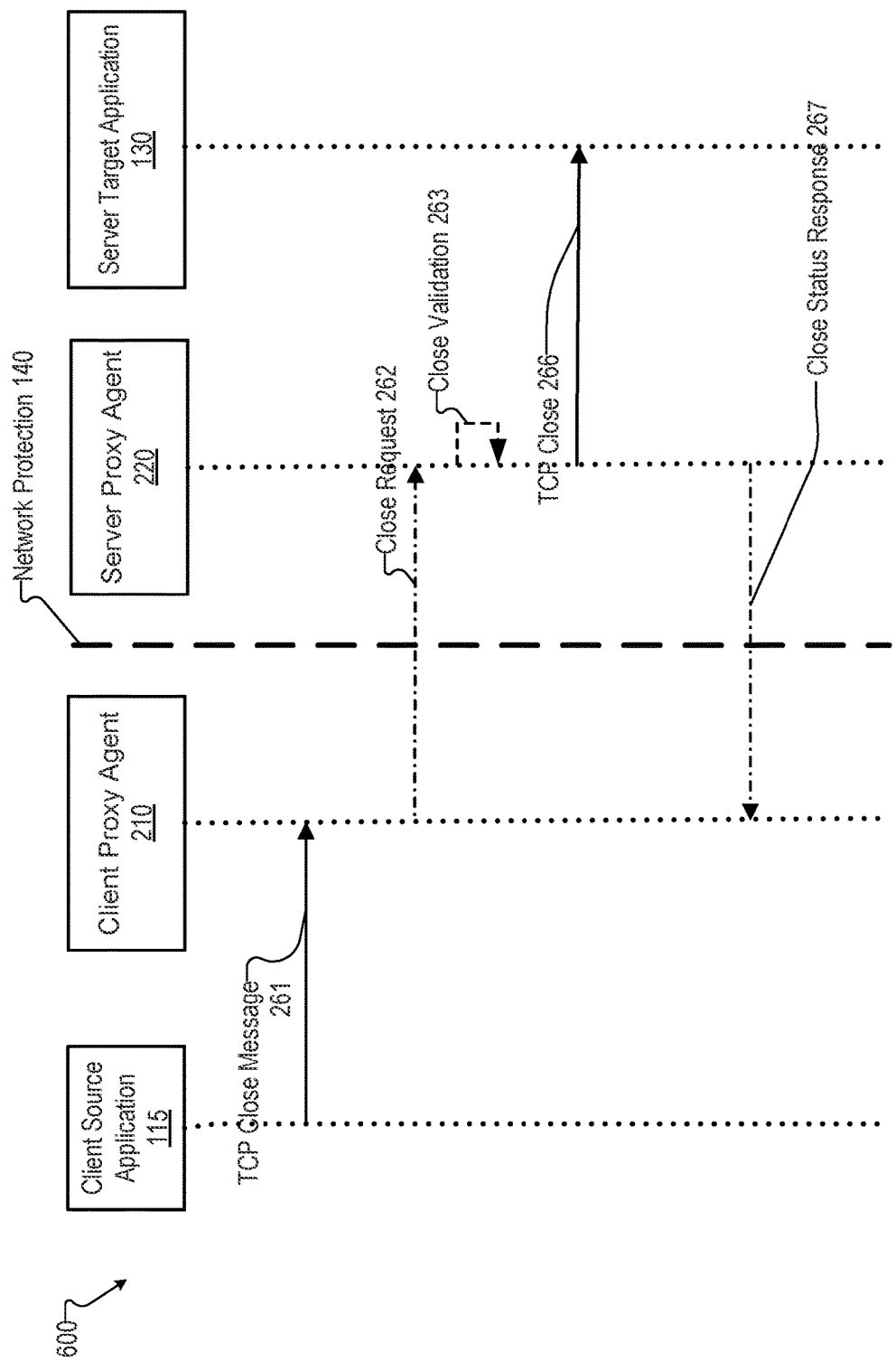

FIG. 2D is a swim lane diagram 201 highlighting a connection closing sequence according to embodiments of the present disclosure. When the source client application 115 has completed the desired data transactions with the target server application 130 in the secure network 125 via the novel communication channel through the network protection 140 as described herein, the client application 115 may close the connection with the client proxy agent 210 via a close connection message 261 over the stateful, long-lived connection previously established between the client application 115 and the client proxy agent 210. Upon receipt of the close connection message 261, the client proxy agent 210 may close the stateful, long-lived connection with the source client application 115 and may then prepare a close request 262 for transmission via the stateless, short-lived protocol for transmission to the server proxy agent 220. The close request prepared by the client proxy agent 210 of the unsecure network 704, 706 may include, for example, in a header, the unique session identifier and the most recent sequence number incremented by the predetermined value.

The server proxy agent 220 in the secure network environment 125, upon receiving the close request 262, may validate the close request 262, e.g., as described above (i.e., by validating the session identifier, and optionally the sequence number to ensure conformance with the previously stored values) (operation 263). When the close request is validated, the server proxy agent 220 may then issue a close connection message to the server application 130 (message 266), thereby resulting in closure of the stateful, long-lived connection previously established between the server proxy agent 220 and the target server application 130.

If the server proxy agent 220 is unable to validate the close request 262 (e.g., unknown session identifier, invalid sequence number, etc.), an error response (not shown) may be sent to the client proxy agent 210 indicating an invalid request as described above. In contrast, where the validation and closing of the connection were successful, a close status response 267 may be sent, e.g., via a stateless, short-lived protocol. In various embodiments, the close status message 267 may include the session identifier and an incremented sequence number, for example, in the header(s) of the close status message 267.

Figure 4:
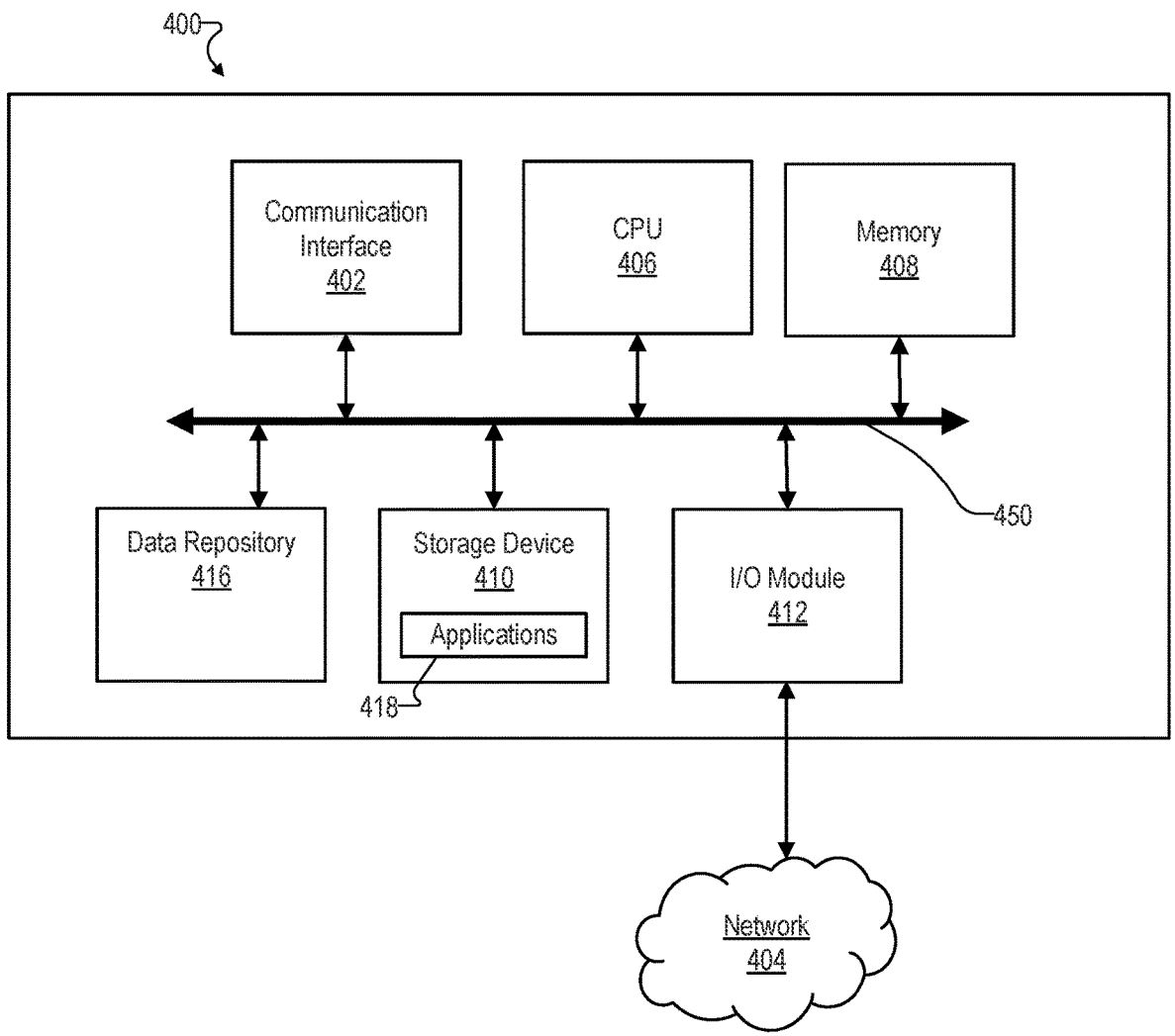
FIG. 4 is a block diagram of an illustrative computing system that can be implemented for systems and methods consistent with example embodiments described herein.

FIG. 4 is a block diagram of an example of a computing system 400 that may be used for implementing systems and methods consistent with embodiments of the present techniques. Other components and/or arrangements may also be used. In some implementations, computing system 400 may be used to implement, at least partially, various components of embodiments of the present disclosure, such as the client device 110, the server device 120, the client proxy agent 210, the server proxy agent 220, and the network protection device(s) 140, among others. In some implementations, a series of computing systems similar to computing system 400 may be each customized with specialized hardware and/or programmed as a specialized server to implement the components, which may communicate with each other via a network 404, which may be or connect to one or more of the networks 704, 706, 708.

In the example shown in FIG. 4, the computing system 400 includes a number of components, such as a central processing unit (CPU) 406, a memory 408, an input/output (I/O) module 410, and a nonvolatile storage device 410. System 400 can be implemented in various ways. For example, an implementation as an integrated platform (such as a server, workstation, personal computer, laptop, etc.) may comprise a CPU 406, a memory 408, and I/O module 412. In such a configuration, the components 406, 408 410 may connect and communicate through a local data bus 450 and may access a data repository 416 (implemented, for example, as a separate database system) via an external I/O connection. The I/O module 412 may connect to external devices through a direct communication link (e.g., a hardwired or local Wi-Fi connection), through a network, such as a local area network (LAN) or a WAN, such as a cellular telephone network or the Internet, and/or through other suitable connections. System 400 may be standalone or it may be a subsystem of a larger system.

The CPU 406 may be one or more known processor or processing devices, such as a microprocessor from the Core™ family manufactured by the Intel™ Corporation of Santa Clara, Calif. or a microprocessor from the Ryzen™ family manufactured by the AMD™ Corporation of Sunnyvale, Calif. The memory 408 may be one or more fast storage devices configured to store instructions and information executed or used by the CPU 406 to perform certain functions, methods, and processes related to implementations of the present techniques. The storage device 410 may be a volatile or non-volatile, magnetic, semiconductor, tape, optical, or other type of storage device or computer-readable medium, including devices such as CDs and DVDs and solid state devices, meant for long-term storage.

In the illustrated implementation, the storage device 410 contains one or more programs or applications 418 that, when executed by the CPU 406, perform various operations, procedures, processes, or methods consistent with the present techniques. Alternatively, the CPU 406 may execute one or more programs located remotely from the system 400. For example, the system 400 may access one or more remote programs via the network 404 that, when executed, perform functions and processes related to implementations of the present techniques.

In one implementation, the storage device 410 may include an applications(s) 418 for performing functions and operations described herein for the source client application 115, the target server application 130, the client proxy agent 210, and/or the server proxy agent 220, among others. In some implementations, the memory 408 may also include other programs or applications that implement other methods and processes that provide ancillary functionality to the present techniques. In some examples, the storage device 410 can include any suitable non-transitory computer-readable media. For example, the non-transitory computer-readable media can include computer-executable instructions that direct the CPU 406 to execute instructions according to techniques described herein.

The storage device 410 may be also be configured with other programs (not shown) unrelated to the present techniques and/or an operating system (not shown) that performs several functions well known in the art when executed by the CPU 406. By way of example, the operating system may be Microsoft Windows™, Unix™' Linux™, an Apple Computers™ operating system, or other operating system. The choice of operating system, and even the use of an operating system, is not critical to the present techniques.

The I/O module(s) 412 may comprise one or more input/output devices that allow data to be received and/or transmitted by the system 400. For example, the I/O module 412 may include one or more input devices, such as a keyboard, touch screen, mouse, and the like, that enable data to be input from a user. Further, the I/O module 412 may include one or more output devices, such as a display screen, a CRT monitor, an LCD monitor, a plasma display, a printer, speaker devices, and the like, that enable data to be output or presented to a user. The I/O module 412 may also include one or more digital and/or analog communication input/output devices that allow the computing system 400 to communicate, for example, digitally, with other machines and devices, including devices in the network 404. Other configurations and/or numbers of input and/or output devices may be incorporated in the I/O module 412.

In the implementation shown, the system 400 is connected to a network 404 (such as the Internet, a private network, a virtual private network, a cellular network or other network or combination of these), which may in turn be connected to various systems and computing machines, such as servers, personal computers, laptop computers, client devices, etc. In general, the system 400 may input data from external machines and devices and output data to external machines and devices via the network 404.

In the example implementation shown in FIG. 4, the data repository 416 is hosted by the system 400. In other implementations, the data repository 416 may be a standalone database external to system 400. In various implementations, the data repository 416 may manage and store data used to implement systems and methods consistent with the present techniques. For example, the data repository 416 can manage and store data structures that include the identifying information, for example, target information (e.g., URL, address, and/or port information) for one or more source client applications 115, target server applications 130 in, for example, a lookup table, and the like.

In some embodiments, the data repository 416 may comprise one or more databases that store information and are accessed and/or managed through the system 400. By way of example, the data repository 416 may be an Oracle™ database, a Sybase™ database, or other relational database. Systems and methods consistent with the present techniques, however, are not limited to separate data structures or databases, or even to the use of a database or data structure.

One of ordinary skill will recognize that the components and implementation details of the system in FIG. 4 are examples presented for conciseness and clarity of explanation. Other components and implementation details may be used.

Although the foregoing examples use specific examples of computerized devices, such a servers and client devices, for clarity of explanation, the present techniques are not limited to those specific examples. Various implementations consistent with the present techniques may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

One of skill will recognize upon review of the present disclosure, that in various implementations, based on the unique session identifier and the sequence number, secure communications between the client proxy agent 210 and the server proxy agent 220 may be accomplished over a single open port in the network protection device(s) 140 for a plurality of source client applications 115, thereby leading to virtual multiplexed connections with the server 120 via a stateless, short-lived connection protocol. Further, based on the relatively small implementation, overhead is reduced, and performance is enhanced. The implementation is also simplified based on the limited number of endpoints.

Other implementations of the present techniques will be apparent to those skilled in the art from consideration of the specification and practice of the techniques disclosed herein. Various modifications of the illustrative embodiments, as well as other embodiments of the subject matter that are apparent to persons skilled in the art to which the disclosed subject matter pertains, are deemed to lie within the scope of the disclosed subject matter.

For example, according to some embodiments where an unencrypted channel is desired between the client proxy agent 210 and the server proxy agent 220, an HTTP protocol may be implemented. In order to secure communications in such an embodiment, a security structure may be implemented, for example, a Diffie Hellman key exchange, at the open stage of the virtual connection.

Further, according to some embodiments, data for virtual connections going to/from the same client proxy agent 210 may be coalesced, as opposed to having open virtual connections polled separately, thereby providing a performance improvement.

Still further, mutual authentication may be implemented between the client proxy agent 210 and the server proxy agent 220 for one or more (e.g., all) requests and responses transmitted via the stateless protocol. For example, a each of the client proxy agent 210 and the server proxy agent 220 may have a respective certificate assigned by a trusted certificate authority allocated. Each request from the client proxy agent 210 may present the certificate allocated to the client proxy agent 210 to the server proxy agent 220, and in response the server proxy agent 220 may present its allocated certificate to the client proxy agent 210 for verification. Similarly, for each response sent by the server proxy agent 220 to the client proxy agent 210, the process may be carried out in reverse. Such a process may enable the server proxy agent 220 and the client proxy agent 210 to reduce the risk and/or impact of malicious attacks, for example, repeated requests to the server proxy agent 220 indicating various port identifiers with the intention of opening an unauthorized connection to a target server application 130.

The disclosure comprises embodiments including, but not limited to, the following clauses:

Clause 1. A system for facilitating a plurality of virtual transmission control protocol connections between a target application and a source application, the system comprising:
a server proxy;
a client proxy; and
a network protection interposed between the server proxy and the client proxy;
wherein the server proxy comprises computer-executable instructions that cause a processor of the server proxy to perform operations comprising:
 receiving an open request from the client proxy via a stateless protocol, wherein the open request includes a target identifier;
 opening a connection between the server proxy and the target application based on the target identifier;
 providing, via the stateless protocol, a response to the client proxy indicating a status of the open request, wherein the response includes at least one of a session identifier and a sequence identifier;
 receiving, via the stateless protocol, a data request from the client proxy, the data request including the session identifier and an incremented sequence identifier, the incremented sequence identifier corresponding to the sequence identifier incremented by a predetermined value; and
 providing, via the stateless protocol, the data request to the target application via the connection between the server proxy and the target application; and wherein
the client proxy comprises second computer-executable instructions that cause a processor of the client proxy to perform operations comprising:
transmitting the open request to the server proxy via the stateless protocol based on a uniform resource locator;
receiving, via the stateless protocol, the response to the open request;
providing, via the stateless protocol, the data request including the session identifier and the incremented sequence identifier incremented by the predetermined value to the server proxy; and
receiving, via the stateless protocol, one or more data messages from the target application via the server proxy.

Clause 2. The system of clause 1, wherein the stateless protocol comprises one of a hypertext transfer protocol and a hypertext transfer protocol secured.

Clause 3. The system of any of clauses 1-2, wherein the sequence identifier comprises a randomly generated, incrementable value.

Clause 4. The system of any of clauses 1-3, wherein at least one of the session identifier, the sequence number, and the incremented sequence number are appended to a header of the response and the one or more data messages.

Clause 5. The system of any of clauses 1-4, wherein the operations performed by the server proxy further comprise, authenticating, by one or more of the server proxy and the target application, the data request based on at least one of the session identifier and the incremented sequence identifier received from the client proxy.

Clause 6. The system of clause 5, wherein the operations performed by the server proxy further comprise, based on the authentication, closing the connection between the target application and the server proxy, and transmitting an error response to the client proxy via the stateless protocol.

Clause 7. The system of any of clauses 1-6, wherein operations performed by the client proxy further comprise:
transmitting, via the stateless protocol a poll instruction following a predetermined period of time without communication from the server proxy, the poll instruction comprising the session identifier and the incremented sequence number incremented by the predetermined value;
receiving, via the stateless protocol, a poll response from the server proxy, the poll response comprising the incremented sequence number incremented by the predetermined value by one of the server proxy and the target application, and one of a no content indicator and a count of buffered messages destined for the client proxy, the buffered messages being buffered at the server proxy during the predetermined period of time.

Clause 8. The system of any of clauses 1-7, wherein the operations performed by the client proxy further comprise:
closing, based on a communication with the source application, a connection between the source application and the client proxy;
transmitting to the server proxy a close request via the stateless protocol.

Clause 9. The system of clause 8, wherein the operations performed by the server proxy further comprise:
receiving the close request; and
closing the connection between the server proxy and the target application.

Clause 10. A server proxy for facilitating a plurality of virtual transmission control protocol connections between a target application and an external device, the server proxy comprising computer-executable instructions that cause a processor to perform operations comprising:
receiving an open request from the external device via a stateless protocol, wherein the open request includes a target identifier;

opening a connection between the server proxy and the target application based on the target identifier;

providing, via the stateless protocol, an open status response to the external device indicating a status of the open request, wherein the open status response includes at least one of a session identifier and a sequence identifier;

receiving, via the stateless protocol, a data request from the external device including the session identifier and an incremented sequence identifier, the incremented sequence identifier corresponding to the sequence identifier incremented by a predetermined value; and providing, via the stateless protocol, the data from the received data request to the target application via the connection between the server proxy and the target application.

Clause 11. The server proxy of clause 10, wherein the stateless protocol comprises one of a hypertext transfer protocol and a hypertext transfer protocol secured.

Clause 12. The server proxy of any of clauses 10-11, wherein the sequence identifier comprises a randomly generated, incrementable value.

Clause 13. The server proxy of any of clauses 10-12, wherein the server proxy is configured to buffer one or more responsive messages destined for the external device and received from the target application in response to the data request.

Clause 14. The server proxy of any of clauses 10-13, wherein the operations further comprise:

providing a second response to the external device, the second response comprising the incremented sequence number incremented by the predetermined value by the server, and at least one of a status of the data request and a value indicating a count of data messages currently buffered at the server proxy and destined for the external device.

Clause 15. The server proxy of any of clauses 10-14, wherein the operations further comprise:

authenticating the data request based on at least one of the session identifier and the incremented sequence number.

Clause 16. The server proxy of clause 15, wherein the operations further comprise closing the connection between the server proxy and the target application based on a result of the authenticating.

Clause 17. The server proxy of any of clauses 11-16, wherein at least one of the session identifier, the sequence number, and the incremented sequence number are appended to a header of the open status response and the data request.

Clause 18. The server proxy of any of clauses 10-17, wherein the connection opened between the server proxy and the target application comprises a stateful connection.

Clause 19. The server proxy of any of clauses 10-18, wherein the operations further comprise:

receiving, via the stateless protocol, a poll request from the external device following a predetermined period of time without communication from the external device, the poll request comprising the session identifier and the incremented sequence number incremented by the predetermined value by the external device;

providing, via the stateless protocol, a poll response, the poll response comprising the incremented sequence number incremented by the predetermined value, and at least one of a no content indicator and a count of messages buffered for the external device during the predetermined period of time.

Clause 20. The server proxy of clause 19, wherein the operations further comprise, when the poll response indicates that the count of buffered messages is greater than zero, transmitting, via the stateless protocol, the buffered messages to the external device.

Clause 21. The server proxy of any of clauses 10-20, wherein the external device is separated from the server proxy by at least one network protection device.

Clause 22. A client proxy for communicating with a target application, the client proxy comprising computer-executable instructions that cause a processor to perform operations comprising:

providing an open request via a stateless protocol based on a uniform resource locator, wherein the open request includes a target identifier;

receiving, via the stateless protocol, a response to the open request, the response indicating a status of the open request and including at least one of a session identifier and a sequence identifier;

providing, via the stateless protocol, a data request including the session identifier and an incremented sequence identifier, the incremented sequence identifier corresponding to the sequence identifier incremented by a predetermined value; and receiving, via the stateless protocol, one or more data responses originating from the target application.

Clause 23. The client proxy of clause 22, wherein the stateless protocol comprises one of a hypertext transfer protocol and a hypertext transfer protocol secured.

Clause 24. The client proxy of any of clauses 22-23, wherein the sequence identifier comprises a randomly generated, incrementable value.

Clause 25. The client proxy of any of clauses 23-24, wherein at least one of the session identifier, the sequence number, and the incremented sequence number are appended to a header of the response and the data request.

Clause 26. The client proxy of any of clauses 22-25, wherein the operations further comprise:

providing, via the stateless protocol, a poll request following a predetermined period of time without communication with the target application, the poll request comprising the session identifier and the incremented sequence number incremented by the predetermined value;

receiving, via the stateless protocol, a poll response, the poll response comprising one or more of the incremented sequence number incremented remotely from the client proxy by the predetermined value, a no content indicator, and a count of buffered messages destined for the client proxy and buffered during the predetermined period of time.

Clause 27. The client proxy of any of clauses 22-26, wherein at least one of a firewall and a gateway device is interposed between the client device and the secured application.

Clause 28. The client proxy of any of clauses 22-27, wherein the operations further comprise:

transmitting the one or more data messages, via a stateful connection, to a source application.

Clause 29. A method for performing communications via virtual transmission control protocol connections between a target application within a secured environment and a device external to the secured environment, the method comprising:

receiving an open request from the external device via a stateless protocol, wherein the open request includes a target identifier;

opening a stateful connection via a network resource within the secured environment with the target application based on the target identifier;

providing, via the stateless protocol, a response to the external device indicating a status of the open request, wherein the response includes at least one of a session identifier and a sequence identifier;

receiving, via the stateless protocol, a data request from the external device including the session identifier and an incremented sequence identifier, the incremented sequence identifier corresponding to the sequence identifier incremented by a predetermined value; and transmitting, via the stateless protocol, data from the received data request to the target application via the stateful connection.

Clause 30. The method of clause 29, wherein the stateless protocol comprises one of a hypertext transfer protocol and a hypertext transfer protocol secured.

What is claimed is:

1. A system for facilitating a plurality of virtual transmission control protocol connections between a target application and a source application, the system comprising:
   a server proxy;
   a client proxy; and
   a network protection interposed between the server proxy and the client proxy;
   wherein the server proxy comprises computer-executable instructions that cause a processor of the server proxy to perform operations comprising:
      receiving an open request from the client proxy via a stateless protocol, wherein the open request includes a target identifier;
      opening a connection between the server proxy and the target application based on the target identifier;
      providing, via the stateless protocol, a response to the client proxy indicating a status of the open request, wherein the response includes a session identifier and a sequence identifier;
      receiving, via the stateless protocol, a data request from the client proxy, the data request including the session identifier and an incremented sequence identifier, the incremented sequence identifier corresponding to the sequence identifier incremented by a predetermined value; and
      providing, via the stateless protocol, the data request to the target application via the connection between the server proxy and the target application; and wherein
   the client proxy comprises second computer-executable instructions that cause a processor of the client proxy to perform operations comprising:
      transmitting the open request to the server proxy via the stateless protocol based on a uniform resource locator;
      receiving, via the stateless protocol, the response to the open request;
      providing, via the stateless protocol, the data request including the session identifier and the incremented sequence identifier incremented by the predetermined value to the server proxy;
      receiving, via the stateless protocol, one or more data messages from the target application via the server proxy;
      transmitting, via the stateless protocol, a poll instruction following a predetermined period of time without communication from the server proxy, the poll instruction comprising the session identifier and the incremented sequence number incremented by the predetermined value; and
      receiving, via the stateless protocol, a poll response from the server proxy.

2. The system of claim 1, wherein the stateless protocol comprises one of a hypertext transfer protocol and a hypertext transfer protocol secured.

3. The system of claim 1, wherein the sequence identifier comprises a randomly generated, incrementable value.

4. The system of claim 1, wherein at least one of the session identifier, the sequence number, or the incremented sequence number are appended to a header of the response and the one or more data messages.

5. The system of claim 1, wherein the operations performed by the server proxy further comprise, authenticating, by one or more of the server proxy and the target application, the data request based on at least one of the session identifier or the incremented sequence identifier received from the client proxy.

6. The system of claim 5, wherein the operations performed by the server proxy further comprise, based on the authentication, closing the connection between the target application and the server proxy, and transmitting an error response to the client proxy via the stateless protocol.

7. The system of claim 1, wherein
   the poll response comprises the incremented sequence number incremented by the predetermined value by one of the server proxy and the target application, and one of a no content indicator and a count of buffered messages destined for the client proxy, the buffered messages being buffered at the server proxy during the predetermined period of time.

8. The system of claim 1, wherein the operations performed by the client proxy further comprise:
   closing, based on a communication with the source application, a connection between the source application and the client proxy;
   transmitting to the server proxy a close request via the stateless protocol.

9. The system of claim 8, wherein the operations performed by the server proxy further comprise:
   receiving the close request; and
   closing the connection between the server proxy and the target application.

10. A server proxy for facilitating a plurality of virtual transmission control protocol connections between a target application and an external device, the server proxy comprising:
    a processor; and
    a non-transitory computer readable storage medium comprising computer-executable instructions that cause the processor to perform operations comprising:
       receiving an open request from the external device via a stateless protocol, wherein the open request includes a target identifier;
       opening a connection between the server proxy and the target application based on the target identifier;
       providing, via the stateless protocol, an open status response to the external device indicating a status of the open request, wherein the open status response includes a session identifier and a sequence identifier;
       receiving, via the stateless protocol, a data request from the external device including the session identifier and an incremented sequence identifier, the incremented sequence identifier corresponding to the sequence identifier incremented by a predetermined value;

providing, via the stateless protocol, the data from the received data request to the target application via the connection between the server proxy and the target application receiving, via the stateless protocol, a poll instruction from the external device following a predetermined period of time without communication from the external device, the poll request comprising the session identifier and the incremented sequence number incremented by the predetermined value by the external device; and providing, via the stateless protocol, a poll response.

11. The server proxy of claim 10, wherein the stateless protocol comprises one of a hypertext transfer protocol and a hypertext transfer protocol secured.

12. The server proxy of claim 10, wherein the sequence identifier comprises a randomly generated, incrementable value.

13. The server proxy of claim 10, wherein the server proxy is configured to buffer one or more responsive messages destined for the external device and received from the target application in response to the data request.

14. The server proxy of claim 10, wherein the operations further comprise:

providing a second response to the external device, the second response comprising the incremented sequence number incremented by the predetermined value by the server, and at least one of a status of the data request or a value indicating a count of data messages currently buffered at the server proxy and destined for the external device.

15. The server proxy of claim 10, wherein the operations further comprise:

authenticating the data request based on at least one of the session identifier or the incremented sequence number.

16. The server proxy of claim 15, wherein the operations further comprise closing the connection between the server proxy and the target application based on a result of the authenticating.

17. The server proxy of claim 11, wherein at least one of the session identifier, the sequence number, or the incremented sequence number are appended to a header of the open status response and the data request.

18. The server proxy of claim 10, wherein the connection opened between the server proxy and the target application comprises a stateful connection.

19. The server proxy of claim 10, wherein the poll response comprises the incremented sequence number incremented by the predetermined value, and at least one of a no content indicator or a count of messages buffered for the external device during the predetermined period of time.

20. The server proxy of claim 19, wherein the operations further comprise, when the poll response indicates that the count of buffered messages is greater than zero, transmitting, via the stateless protocol, the buffered messages to the external device.

21. The server proxy of claim 10, wherein the external device is separated from the server proxy by at least one network protection device.

22. A client proxy for communicating with a target application, the client proxy comprising:

a processor; and a non-transitory computer readable storage medium comprising computer-executable instructions that cause the processor to perform operations comprising:

providing an open request via a stateless protocol based on a uniform resource locator, wherein the open request includes a target identifier;

receiving, via the stateless protocol, a response to the open request, the response indicating a status of the open request and including a session identifier and a sequence identifier;

providing, via the stateless protocol, a data request including the session identifier and an incremented sequence identifier, the incremented sequence identifier corresponding to the sequence identifier incremented by a predetermined value;

receiving, via the stateless protocol, one or more data responses originating from the target application;

providing, via the stateless protocol, a poll instruction following a predetermined period of time without communication with the target application, the poll request comprising the session identifier and the incremented sequence number incremented by the predetermined value; and receiving, via the stateless protocol, a poll response.

23. The client proxy of claim 22, wherein the stateless protocol comprises one of a hypertext transfer protocol and a hypertext transfer protocol secured.

24. The client proxy of claim 22, wherein the sequence identifier comprises a randomly generated, incrementable value.

25. The client proxy of claim 23, wherein at least one of the session identifier, the sequence number, or the incremented sequence number are appended to a header of the response and the data request.

26. The client proxy of claim 22, wherein the poll response comprises one or more of the incremented sequence number incremented remotely from the client proxy by the predetermined value, a no content indicator, and a count of buffered messages destined for the client proxy and buffered during the predetermined period of time.

27. The client proxy of claim 22, wherein at least one of a firewall or a gateway device is interposed between the client device and the secured application.

28. The client proxy of claim 22, wherein the operations further comprise:

transmitting the one or more data messages, via a stateful connection, to a source application.

29. A method for performing communications via virtual transmission control protocol connections between a target application within a secured environment and a device external to the secured environment, the method comprising:

receiving an open request from the external device via a stateless protocol, wherein the open request includes a target identifier;

opening a stateful connection via a network resource within the secured environment with the target application based on the target identifier;

providing, via the stateless protocol, a response to the external device indicating a status of the open request, wherein the response includes a session identifier and a sequence identifier;

receiving, via the stateless protocol, a data request from the external device including the session identifier and an incremented sequence identifier, the incremented sequence identifier corresponding to the sequence identifier incremented by a predetermined value;

transmitting, via the stateless protocol, data from the received data request to the target application via the stateful connection;

receiving, via the stateless protocol, a poll instruction from the external device following a predetermined period of time without communication with the target application, the poll request comprising the session identifier and the incremented sequence number incremented by the predetermined value; and sending, via the stateless protocol, a poll response.

30. The method of claim 29, wherein the stateless protocol comprises one of a hypertext transfer protocol and a hypertext transfer protocol secured.

\* \* \* \* \*